(12) United States Patent
Tada et al.

(10) Patent No.: US 10,914,844 B2
(45) Date of Patent: Feb. 9, 2021

(54) SIGNAL PROCESSING DEVICE FOR X-RAY ANALYSIS AND ADJUSTMENT METHOD FOR A SIGNAL PROCESSING DEVICE FOR X-RAY ANALYSIS

(71) Applicant: Rigaku Corporation, Akishima (JP)

(72) Inventors: Tsutomu Tada, Ibaraki (JP); Yukio Sako, Ibaraki (JP)

(73) Assignee: RIGAKU CORPORATION, Tokyo (JP)

( * ) Notice: Subject to any disclaimer, the term of this patent is extended or adjusted under 35 U.S.C. 154(b) by 0 days.

(21) Appl. No.: 16/647,023

(22) PCT Filed: Jul. 12, 2018

(86) PCT No.: PCT/JP2018/026307
§ 371 (c)(1),
(2) Date: Mar. 13, 2020

(87) PCT Pub. No.: WO2019/064824
PCT Pub. Date: Apr. 4, 2019

(65) Prior Publication Data
US 2020/0209408 A1 Jul. 2, 2020

(30) Foreign Application Priority Data

Sep. 29, 2017 (JP) ................................. 2017-190201

(51) Int. Cl.
*G01T 1/17* (2006.01)
(52) U.S. Cl.
CPC ...................... *G01T 1/17* (2013.01)
(58) Field of Classification Search
CPC ...................................................... G01T 1/17
See application file for complete search history.

(56) References Cited

U.S. PATENT DOCUMENTS 3,483,377 A * 12/1969 Borkowski ............. H01L 31/00
  250/374
3,872,287 A * 3/1975 Koeman ................... G01T 1/36
  250/370.06

(Continued)

FOREIGN PATENT DOCUMENTS

JP   H07-333346 A   12/1995
JP   H10-318946 A   12/1998

(Continued)

OTHER PUBLICATIONS

English translation of the International Search Report for PCT/JP2018/026307 dated Oct. 9, 2018.

*Primary Examiner* — Blake C Riddick
(74) *Attorney, Agent, or Firm* — HEA Law PLLC

(57) ABSTRACT

Provided are a signal processing device for X-ray analysis and an adjustment method for a signal processing device for X-ray analysis, which are capable of performing correction of a time constant with high precision and simply and quickly performing adjustment work required for performing the correction. The signal processing device for X-ray analysis includes: a differentiating circuit configured to use a first time constant to convert a signal output from an X-ray detector into an analog differential wave; an AD converter configured to convert the analog differential wave into a digital differential wave; a waveform shaping digital filter configured to use a second time constant to shape the digital differential wave; and a histogram generation unit configured to acquire a feature value of a shaped waveform based on pulse heights in two regions of the shaped waveform, to generate a histogram representing an acquisition frequency for each feature value.

17 Claims, 16 Drawing Sheets

(56) References Cited

U.S. PATENT DOCUMENTS

| | | | | |
|---|---|---|---|---|
| 4,409,615 A * | 10/1983 | McMann, Jr. | ....... | H04N 5/3205 348/E5.089 |
| 4,631,411 A * | 12/1986 | Noback | ..... | G01T 1/18 250/374 |
| 4,730,350 A * | 3/1988 | Albert | ..... | G01N 23/046 378/10 |
| 5,031,199 A * | 7/1991 | Cole, III | ..... | G03F 7/70008 378/34 |
| 5,107,379 A * | 4/1992 | Huber | ..... | G09G 3/3681 360/46 |
| 5,374,964 A * | 12/1994 | Rzeszewski | ..... | H04N 9/646 348/625 |
| 5,519,328 A * | 5/1996 | Bennett | ..... | G01R 27/2605 324/659 |
| 5,576,658 A | 11/1996 | Hushimi et al. | | |
| 5,684,850 A * | 11/1997 | Warburton | ..... | G01T 1/171 378/53 |
| 6,347,288 B1 * | 2/2002 | Trammell | ..... | H03H 11/04 250/336.1 |
| 6,479,829 B1 * | 11/2002 | Katagiri | ..... | G01T 1/20 250/390.11 |
| 7,139,367 B1 * | 11/2006 | Le | ..... | G01V 5/0008 378/98 |
| 2004/0158440 A1 * | 8/2004 | Warburton | ..... | G01T 1/17 702/190 |
| 2008/0044076 A1 * | 2/2008 | Spies | ..... | G06T 11/008 382/132 |
| 2009/0033913 A1 * | 2/2009 | Mott | ..... | G01R 29/02 356/51 |
| 2012/0207277 A1 | 8/2012 | Sako | | |
| 2012/0298875 A1 * | 11/2012 | Ueno | ..... | G01T 1/17 250/362 |
| 2013/0146767 A1 * | 6/2013 | Seino | ..... | G01T 1/171 250/336.1 |
| 2013/0277555 A1 * | 10/2013 | Kooijman | ..... | G01T 1/36 250/336.1 |
| 2014/0197307 A1 * | 7/2014 | Jorion | ..... | G01V 13/00 250/252.1 |
| 2015/0085985 A1 * | 3/2015 | Funaki | ..... | H04N 5/378 378/98 |
| 2015/0276630 A1 * | 10/2015 | Kinugasa | ..... | G01T 1/17 378/46 |
| 2018/0239578 A1 * | 8/2018 | Rossum | ..... | H03H 17/0294 |

FOREIGN PATENT DOCUMENTS

| | | |
|---|---|---|
| JP | 2001-004752 A | 1/2001 |
| JP | 2005-121392 A | 5/2005 |
| JP | 2011-252738 A | 12/2011 |
| JP | 2012-168124 A | 9/2012 |
| JP | 2015-021957 A | 2/2015 |

* cited by examiner

FIG.2
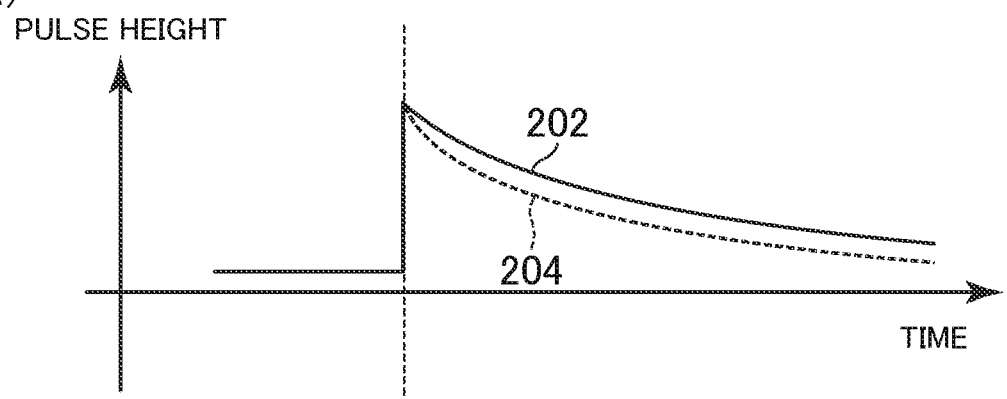
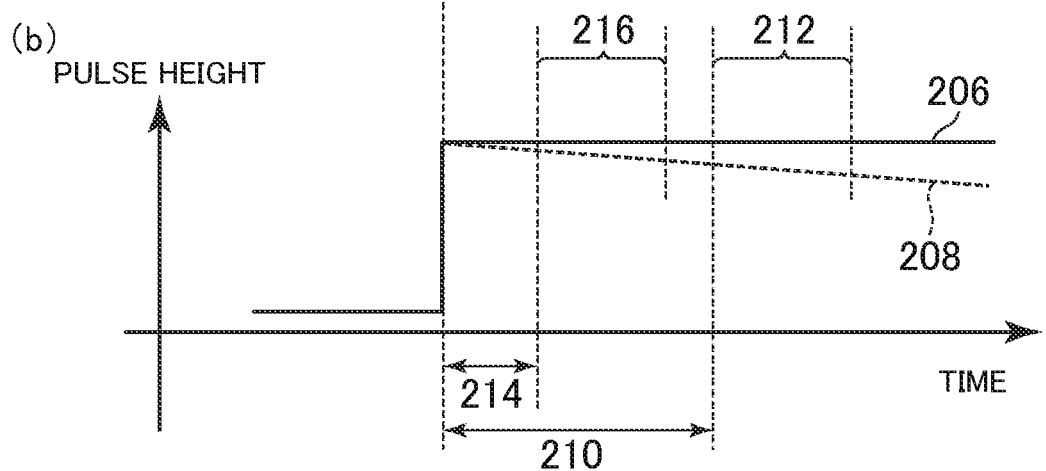

FIG.6
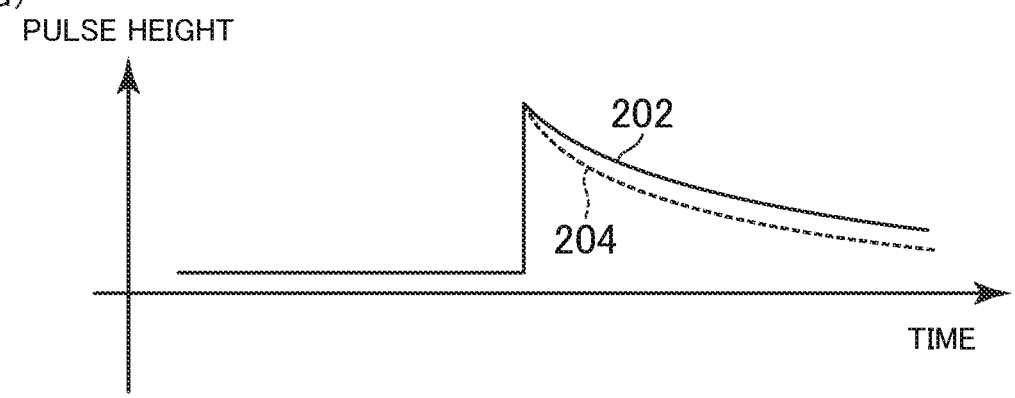
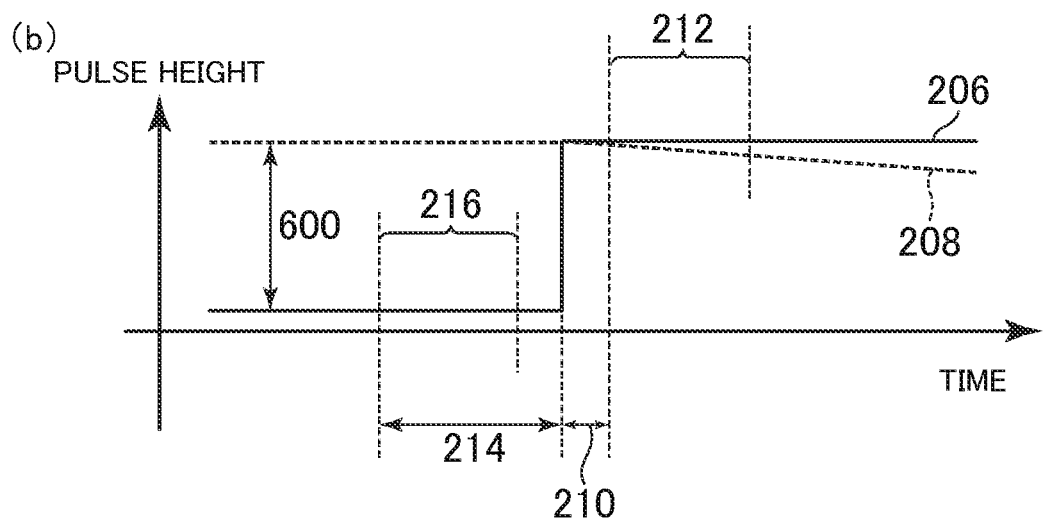

FIG. 9
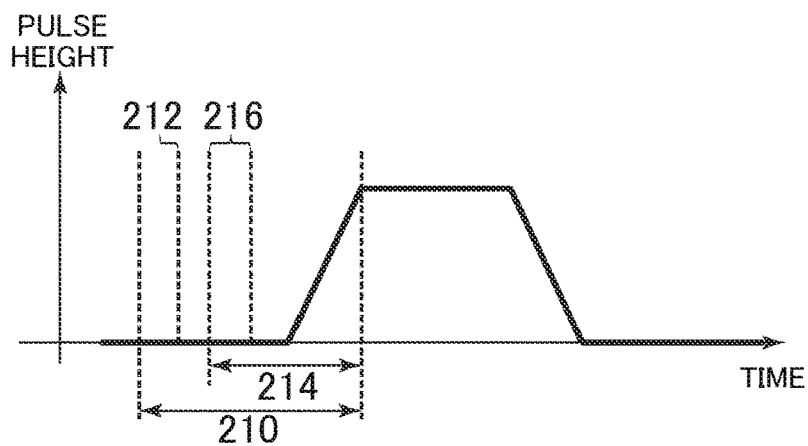
(a)
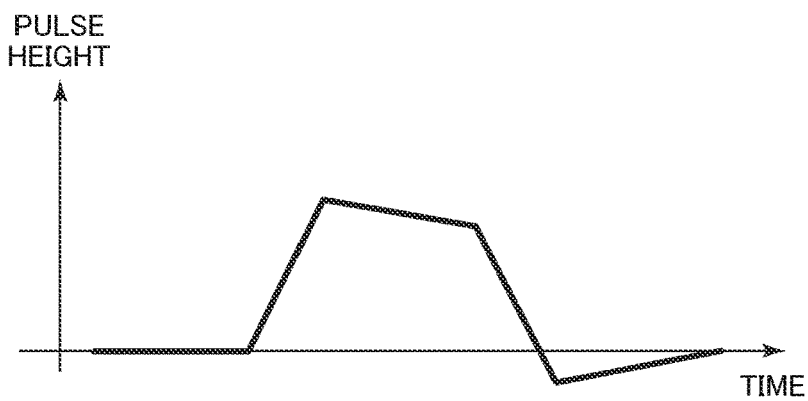
(b)
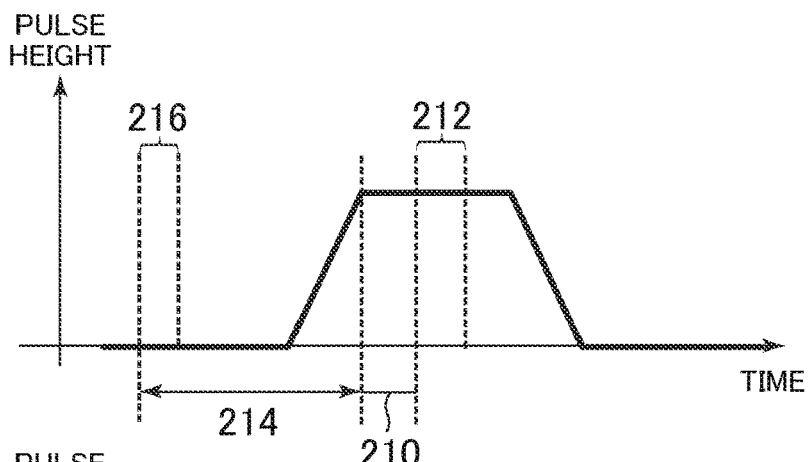
(c)
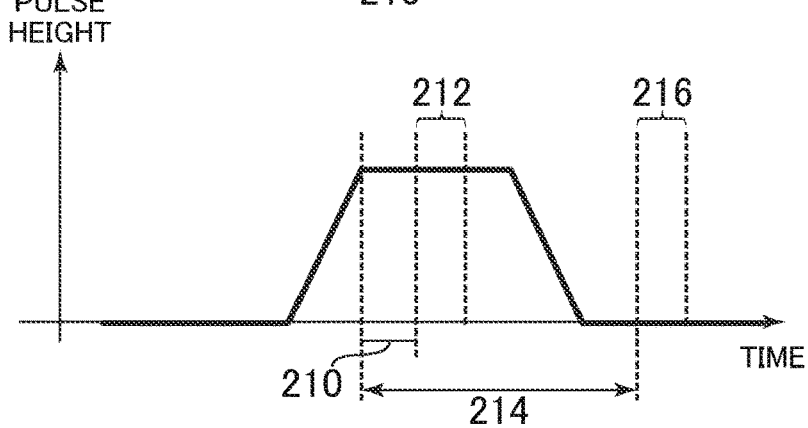
(d)

FIG.10
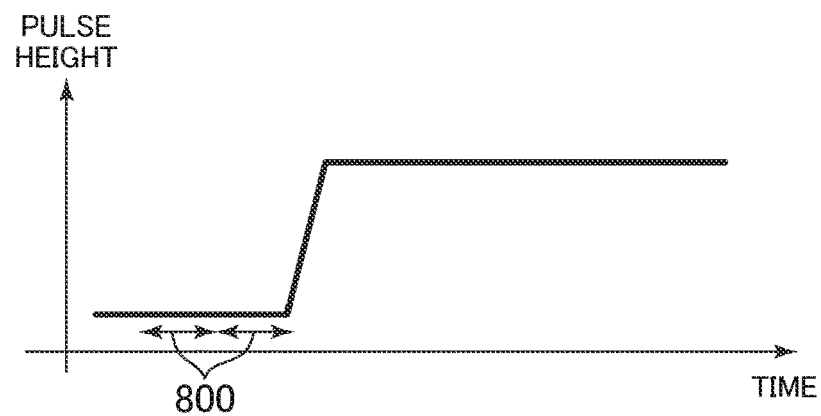
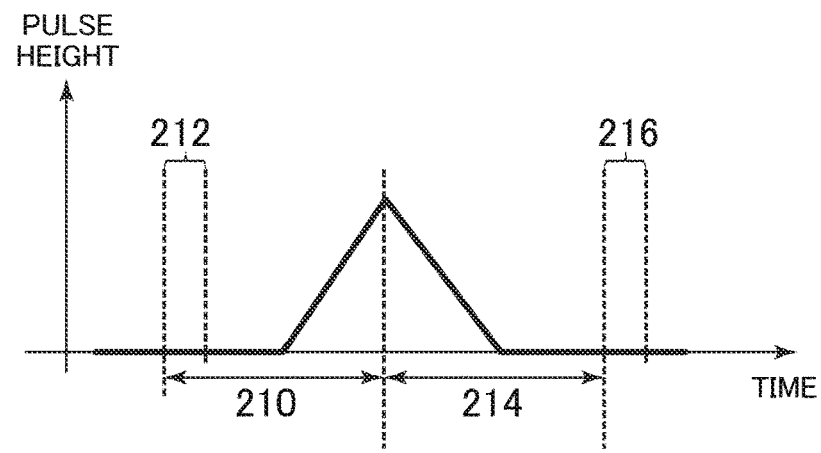
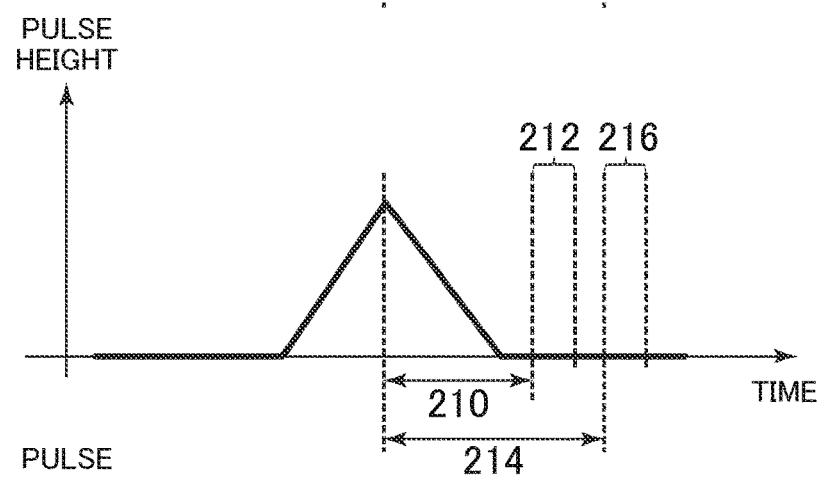
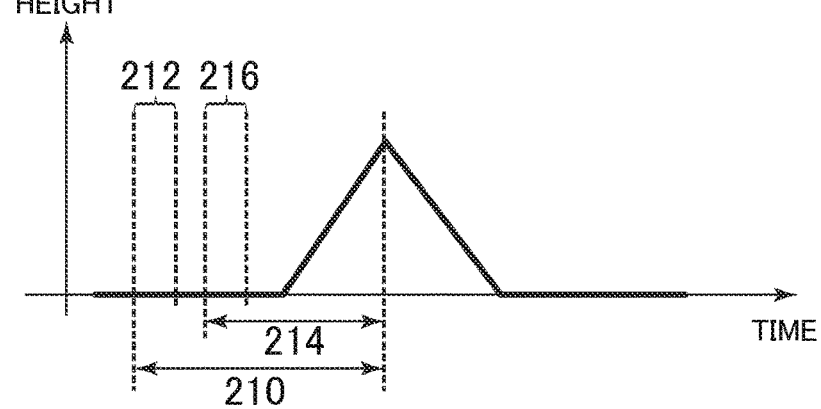

FIG.12
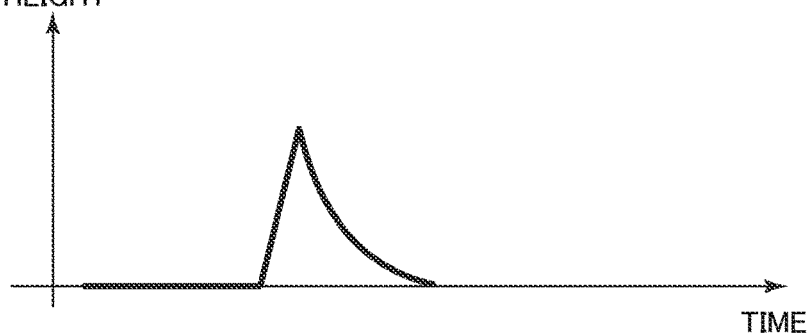
(a) PULSE HEIGHT
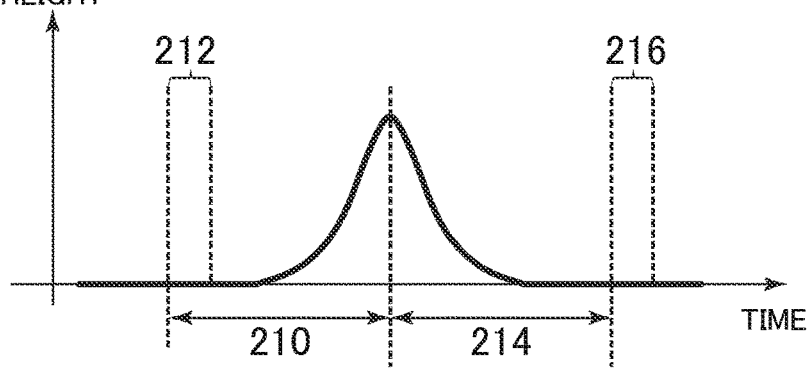
(b) PULSE HEIGHT
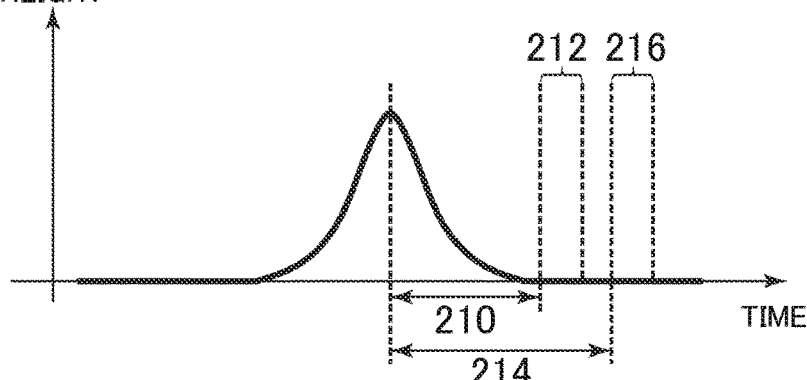
(c) PULSE HEIGHT
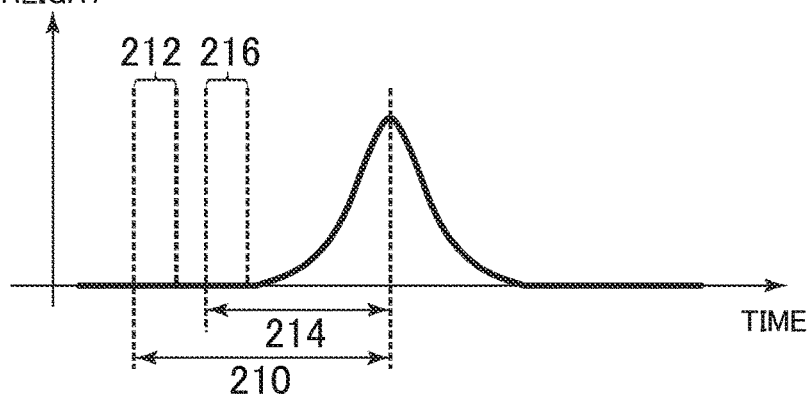
(d) PULSE HEIGHT

FIG.13
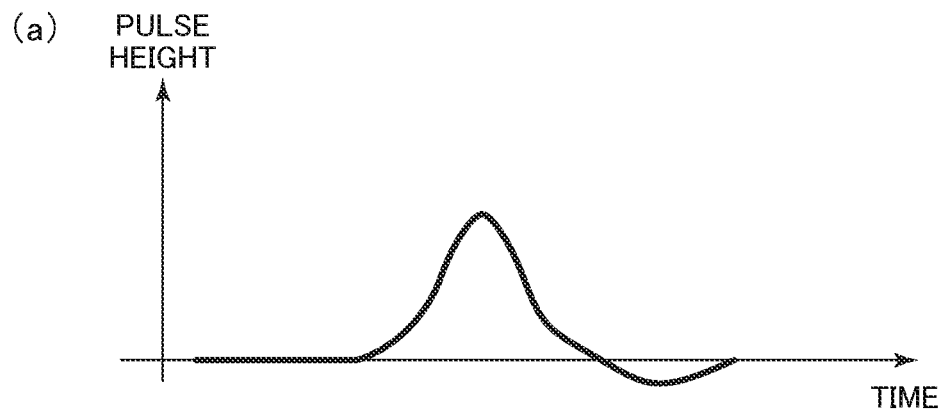
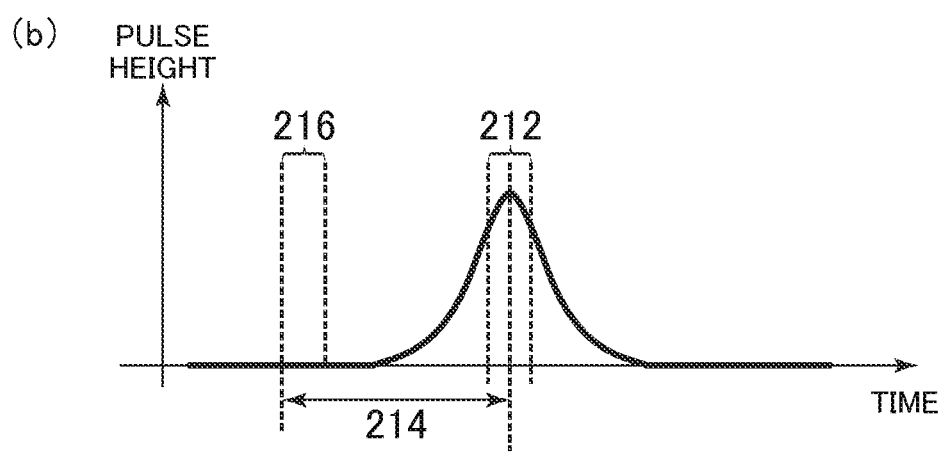
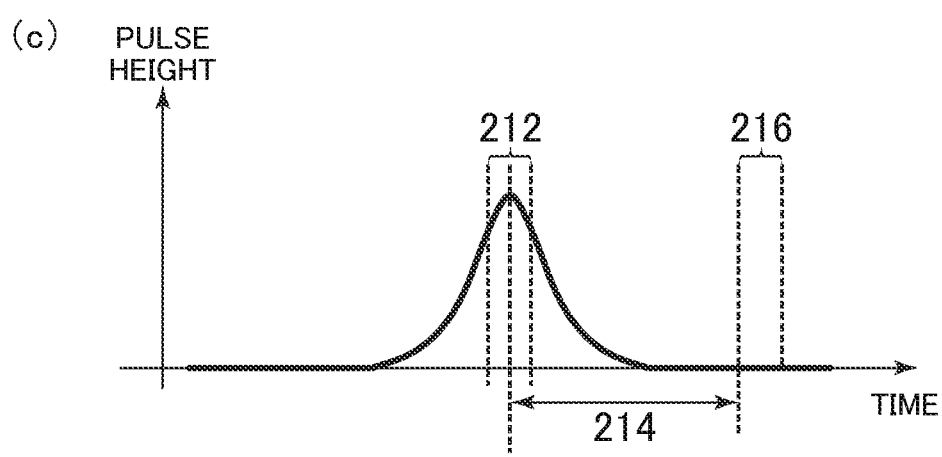

FIG.15
BACKGROUND ART
(a) 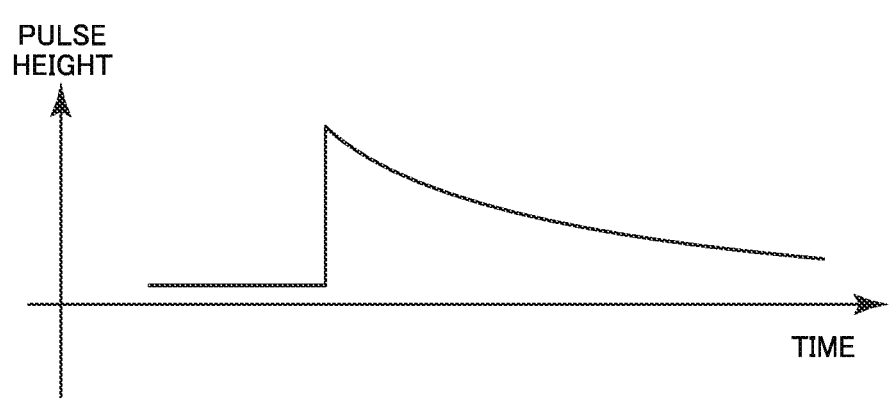
(b) 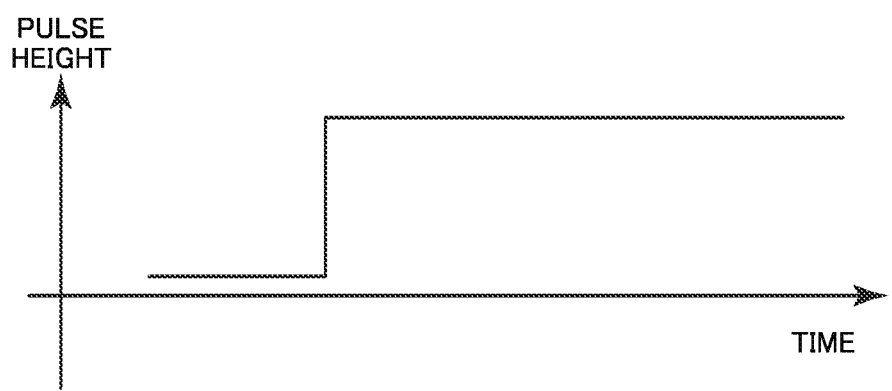

FIG.16
BACKGROUND ART
(a)
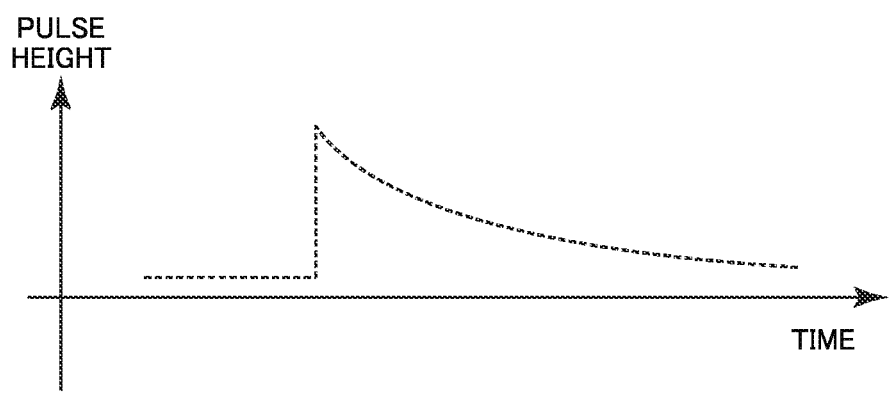
(b)
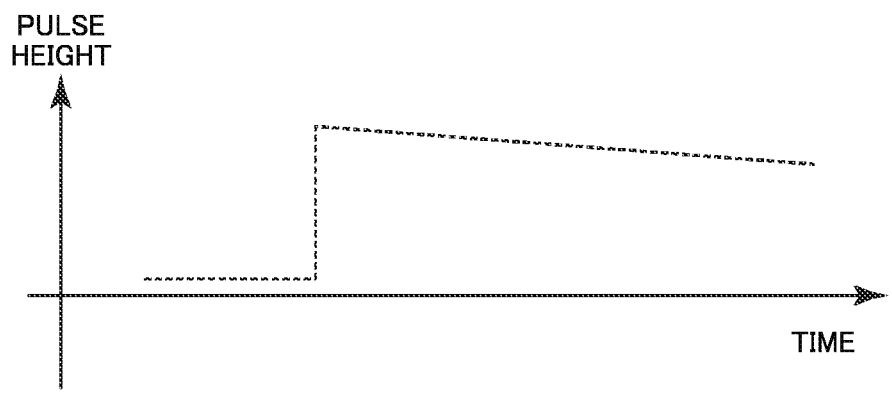

SIGNAL PROCESSING DEVICE FOR X-RAY ANALYSIS AND ADJUSTMENT METHOD FOR A SIGNAL PROCESSING DEVICE FOR X-RAY ANALYSIS

CROSS REFERENCE TO RELATED APPLICATIONS

This application is a National Stage of International Application No. PCT/JP2018/026307 filed on Jul. 12, 2018, which claims priority from Japanese Patent Application 2017-190201, filed on Sep. 29, 2017. The contents of the above documents are incorporated herein by reference in their entirety.

TECHNICAL FIELD

The present invention relates to a signal processing device for X-ray analysis and an adjustment method for a signal processing device for X-ray analysis.

BACKGROUND ART

An X-ray spectrometer is known as an instrument which analyzes, for example, elements in a sample to be measured based on X-rays emitted from the sample irradiated by incident X-rays. An X-ray detector in the X-ray spectrometer detects X-rays emitted from or reflected by the sample irradiated by primary X-rays. The signals induced by the X-rays are processed depending on the pulse height of each signal by a signal processing device for X-ray analysis (See Patent Literatures 1 and 2).

An energy spectrum is obtained by the signal processing and for example, elemental analysis of the sample is performed based on the data processing of the energy spectrum. FIG. 14 is an example of a block diagram for illustrating a conventional signal processing device for X-ray analysis. The signal processing device for X-ray analysis includes an X-ray detector 102, a preamplifier 104, a differentiating circuit 106, an AD converter 108, and a waveform shaping digital filter 116.

Specifically, the output signal of the X-ray detector 102 is proportional to the energy of the detected X-rays. The signal is an analog signal, for example, a stepwise waveform (hereinafter referred to as "stepped wave"). The signal is amplified by the preamplifier 104, and is then differentiated by the differentiating circuit 106. The differentiated signal is a waveform that, as shown in, for example, FIG. 15(a), rises steeply at a time at which the stepped wave rises and then gradually attenuates in accordance with a time constant of the differentiating circuit 106. The analog signal output from the differentiating circuit 106 is converted into a digital signal by the AD converter 108. The signal converted into the digital signal is shaped into a stepped wave by the waveform shaping digital filter 116 as shown in FIG. 15(b) (see Patent Literatures 3 to 5).

However, there is a problem in that the stepped wave is not shaped correctly when the time constant of the differentiating circuit 106 is not the same as the time constant of the waveform shaping digital filter 116. A capacitance of a capacitor, a resistance value of a resistor, and other physical quantity generally have a tolerance of about ± several %. Therefore, a differential time constant of the differentiating circuit manufactured with those parts deviates from a design value by about ± several %. In this case, the shaped signal becomes a waveform having a slope after a rising edge as shown in FIG. 16(b), for example. The slope leads to deterioration of accuracy when calculating a difference (namely, X-ray energy) between pulse heights before and after the rising edge. The waveform shown in FIG. 16(a) is the waveform before being shaped into the waveform shown in FIG. 16(b). In general, in order to suppress deterioration of energy resolution, the difference between the time constant of the differentiating circuit and the time constant of the waveform shaping digital filter is required to be smaller than at least 1%.

Therefore, in order to minimize the difference between the time constant of the differentiating circuit and the time constant of the waveform shaping digital filter, a high-precision capacitor or resistor has been used in the differentiating circuit, which is an analog circuit. However, high-precision parts are expensive, and hence manufacturing costs become higher. There are also limitations on the accuracy of the parts.

In view of the foregoing, the following point is disclosed in Patent Literature 5. That is, 96 kinds of time constants are used to calculate 96 kinds of trapezoidal waves from the stepped wave obtained after waveform shaping. Then, the slopes before and after each of the trapezoidal waves are compared with each other. When there is a difference in the slope, it is determined that there is a deviation in the time constant, and correction is performed by selecting an optimal time constant from a table provided in advance.

CITATION LIST

Patent Literature

[Patent Literature 1] JP 07-333346 A
[Patent Literature 2] JP 10-318946 A
[Patent Literature 3] JP 2005-121392 A
[Patent Literature 4] JP 2012-168124 A
[Patent Literature 5] JP 2015-21957 A

SUMMARY OF INVENTION

Technical Problem

According to Patent Literature 5 described above, selection of a time constant used for correction is performed based on evaluation using several tens of (average of 16) signal waveforms. In this case, sufficient statistical accuracy cannot be obtained, since the number of signal waveforms used for the evaluation is small. It results in low accuracy in the correction. In addition, 96 different trapezoidal waves are calculated through use of different time constants, and hence loads on arithmetic operations are heavy. Thus, much time is required for the correction. It is also required to provide a dedicated measurement sample for evaluating the time constant, and to determine measurement conditions for a device.

The present invention has been made in view of the above-mentioned problems, and has an object to provide a signal processing device for X-ray analysis and an adjustment method for a signal processing device for X-ray analysis, which are capable of performing correction of a time constant with high precision, and simply and quickly performing adjustment work required for performing the correction.

Solution to Problem

A signal processing device for X-ray analysis according to claim 1 includes: a differentiating circuit configured to use a first time constant to convert a signal output from an X-ray detector into a differential wave that is an analog signal; an AD converter configured to convert the differential wave that is the analog signal into a differential wave that is a digital signal; a waveform shaping digital filter configured to use a second time constant to shape the differential wave that is the digital signal; and a histogram generation unit configured to acquire a feature value of a shaped waveform based on pulse heights in at least two regions of the shaped waveform, to generate a histogram representing an acquisition frequency for each feature value.

In a signal processing device for X-ray analysis according to claim 2, in the signal processing device for X-ray analysis according to claim 1, the histogram generation unit includes a pulse height analyzer configured to measure pulse heights in at least a first region and a second region in a flat portion of the shaped waveform, and acquire a difference between the measured values in the first region and the second region as the feature value, and the first time constant or the second time constant is adjusted under software control so that energy at a peak of the histogram has a zero value when the energy at the peak deviates from the zero value.

In a signal processing device for X-ray analysis according to claim 3, in the signal processing device for X-ray analysis according to claim 1, the histogram generation unit includes a pulse height analyzer configured to measure pulse heights in at least a first region and a second region in a flat portion of the shaped waveform, and acquire a difference between the measured values in the first region and the second region as the feature value, and the signal processing device for X-ray analysis further includes: an output unit configured to output, when energy at a peak of the histogram deviates from a zero value, information indicating the deviation; and an input unit configured to allow a user to adjust the first time constant or the second time constant based on the information indicating the deviation.

In a signal processing device for X-ray analysis according to claim 4, in the signal processing device for X-ray analysis according to claim 2 or 3, the waveform shaping digital filter is configured to shape the differential wave into a stepped wave, and the pulse height analyzer is configured to measure a difference between the pulse heights in the first region and the second region in a flat portion after a rising edge included in the stepped wave, and acquire the difference as the feature value.

In a signal processing device for X-ray analysis according to claim 5, in the signal processing device for X-ray analysis according to claim 2 or 3, the waveform shaping digital filter is configured to shape the differential wave into a stepped wave, and then shape the stepped wave into a trapezoidal wave based on a difference between pulse heights in two regions having a predetermined time interval therebetween, and the pulse height analyzer is configured to measure a difference between the pulse heights in the first region and the second region in a flat portion of any one of a top portion and a bottom portion of the trapezoidal wave, and acquire the difference as the feature value.

In a signal processing device for X-ray analysis according to claim 6, in the signal processing device for X-ray analysis according to claim 2 or 3, the waveform shaping digital filter is configured to shape the differential wave into a stepped wave, and then shape the stepped wave into a triangular wave based on a difference between pulse heights in two regions that are adjacent to each other, and the pulse height analyzer is configured to measure a difference between the pulse heights in the first region and the second region in a flat portion of a bottom portion of the triangular wave, and acquire the difference as the feature value.

In a signal processing device for X-ray analysis according to claim 7, in the signal processing device for X-ray analysis according to claim 2 or 3, the waveform shaping digital filter is configured to shape the differential wave into a stepped wave, and then use a third time constant to differentiate the stepped wave and further integrate the stepped wave at least once, to thereby shape the stepped wave into a Gaussian wave, and the pulse height analyzer is configured to measure a difference between the pulse heights in the first region and the second region in a flat portion of a bottom portion of the Gaussian wave, and acquire the difference as the feature value.

In a signal processing device for X-ray analysis according to claim 8, in the signal processing device for X-ray analysis according to claim 1, the histogram generation unit includes a pulse height analyzer configured to measure a peak value or a step height included in the shaped waveform, and acquire the peak value or the step height as the feature value, and the first time constant or the second time constant is adjusted under software control so that energy at a peak of the histogram has a predetermined value when the energy at the peak deviates from the predetermined value.

In a signal processing device for X-ray analysis according to claim 9, in the signal processing device for X-ray analysis according to claim 1, the histogram generation unit includes a pulse height analyzer configured to measure a peak value or a step height included in the shaped waveform, and acquire the peak value or the step height as the feature value, and the signal processing device for X-ray analysis further includes: an output unit configured to output, when energy at a peak of the histogram deviates from a predetermined value, information indicating the deviation; and an input unit configured to allow a user to adjust the first time constant or the second time constant based on the information indicating the deviation.

In a signal processing device for X-ray analysis according to claim 10, in the signal processing device for X-ray analysis according to claim 8 or 9, the waveform shaping digital filter is configured to shape the differential wave into a stepped wave, and the pulse height analyzer is configured to measure a difference between the pulse heights in a first region and a second region that are positioned across a rising edge included in the stepped wave as the step height, and acquire the step height as the feature value.

In a signal processing device for X-ray analysis according to claim 11, in the signal processing device for X-ray analysis according to claim 8 or 9, the waveform shaping digital filter is configured to shape the differential wave into a stepped wave, and then shape the stepped wave into a trapezoidal wave based on a difference between pulse heights in two regions having a predetermined time interval therebetween, and the pulse height analyzer is configured to measure a difference between the pulse heights in a first region in a top portion of the trapezoidal wave and a second region in a flat portion before a rising edge of the trapezoidal wave or after a falling edge of the trapezoidal wave as the step height, and acquire the step height as the feature value.

In a signal processing device for X-ray analysis according to claim 12, in the signal processing device for X-ray analysis according to claim 8 or 9, the waveform shaping digital filter is configured to shape the differential wave into a stepped wave, and then shape the stepped wave into a triangular wave based on a difference between pulse heights in two regions that are adjacent to each other, and the pulse height analyzer is configured to measure a difference between the pulse heights in a first region including a peak of the triangular wave and a second region in a flat portion before a peak position of the triangular wave or after the peak position as the peak value, and acquire the peak value as the feature value.

In a signal processing device for X-ray analysis according to claim 13, in the signal processing device for X-ray analysis according to claim 8 or 9, the waveform shaping digital filter is configured to shape the differential wave into a stepped wave, and then use a third time constant to differentiate the stepped wave and further integrate the stepped wave at least once, to thereby shape the stepped wave into a Gaussian wave, and the pulse height analyzer is configured to measure a difference between the pulse heights in a first region including a peak of the Gaussian wave and a second region in a flat portion before the peak position of the Gaussian wave or after the peak position as the peak value, and acquire the peak value as the feature value.

In a signal processing device for X-ray analysis according to claim 14, in the signal processing device for X-ray analysis according to any one of claims 2 to 13, the differentiating circuit includes a capacitor and a variable resistor, and the first time constant is adjusted by the variable resistor.

In a signal processing device for X-ray analysis according to claim 15, in the signal processing device for X-ray analysis according to any one of claims 2 to 14, the pulse height analyzer is further configured to measure a difference between pulse heights in at least two regions that are positioned across a rising edge included in the shaped waveform, and acquire the difference as X-ray energy.

An adjustment method for a signal processing device for X-ray analysis according to claim 16 includes the steps of: using a first time constant to convert a signal output from an X-ray detector into a differential wave that is an analog signal; converting the differential wave that is the analog signal into a differential wave that is a digital signal; using a second time constant to shape the differential wave that is the digital signal; and acquiring a feature value of a shaped waveform based on pulse heights in at least two regions of the shaped waveform, to generate a histogram representing an acquisition frequency for each feature value.

Advantageous Effects of Invention

With the invention according to each of claims 1 to 7 and 15, it is possible to perform the correction for the waveform shaping with high precision, and to simply and quickly perform the adjustment work required for performing the correction.

Further, with the invention according to each of claims 8 to 13, the processing device can be simplified by sharing a normal mechanism for measuring X-ray energy and a mechanism for measuring the pulse height for the adjustment of the time constant.

Further, with the invention according to claim 14, the time constant of the analog circuit is adjusted. Through the adjustment, when it is required to replace the X-ray detector at the time of the operation of the X-ray spectrometer, it is possible to replace not only the X-ray detector but also an analog circuit board for which the time constant has already been adjusted in accordance with the waveform shaping digital filter, which simplifies calibration work for the X-ray spectrometer.

BRIEF DESCRIPTION OF DRAWINGS

FIG. 2 are graphs for showing a differential wave and a stepped wave in a first embodiment of the present invention.

FIG. 6 are graphs for showing a differential wave and a stepped wave in a modification example of the first embodiment.

FIG. 9 are graphs for each showing a waveform in the second embodiment.

FIG. 10 are graphs for each showing a waveform in a third embodiment of the present invention.

FIG. 12 are graphs for each showing a waveform in a fourth embodiment of the present invention.

FIG. 13 are graphs for each showing a waveform in the fourth embodiment.

FIG. 15 are graphs for showing a differential wave and a stepped wave obtained by a conventional signal processor for X-ray analysis.

FIG. 16 are graphs for showing a differential wave and a stepped wave obtained by a conventional signal processor for X-ray analysis when a time constant deviates.

DESCRIPTION OF EMBODIMENTS

First Embodiment

Figure 1:
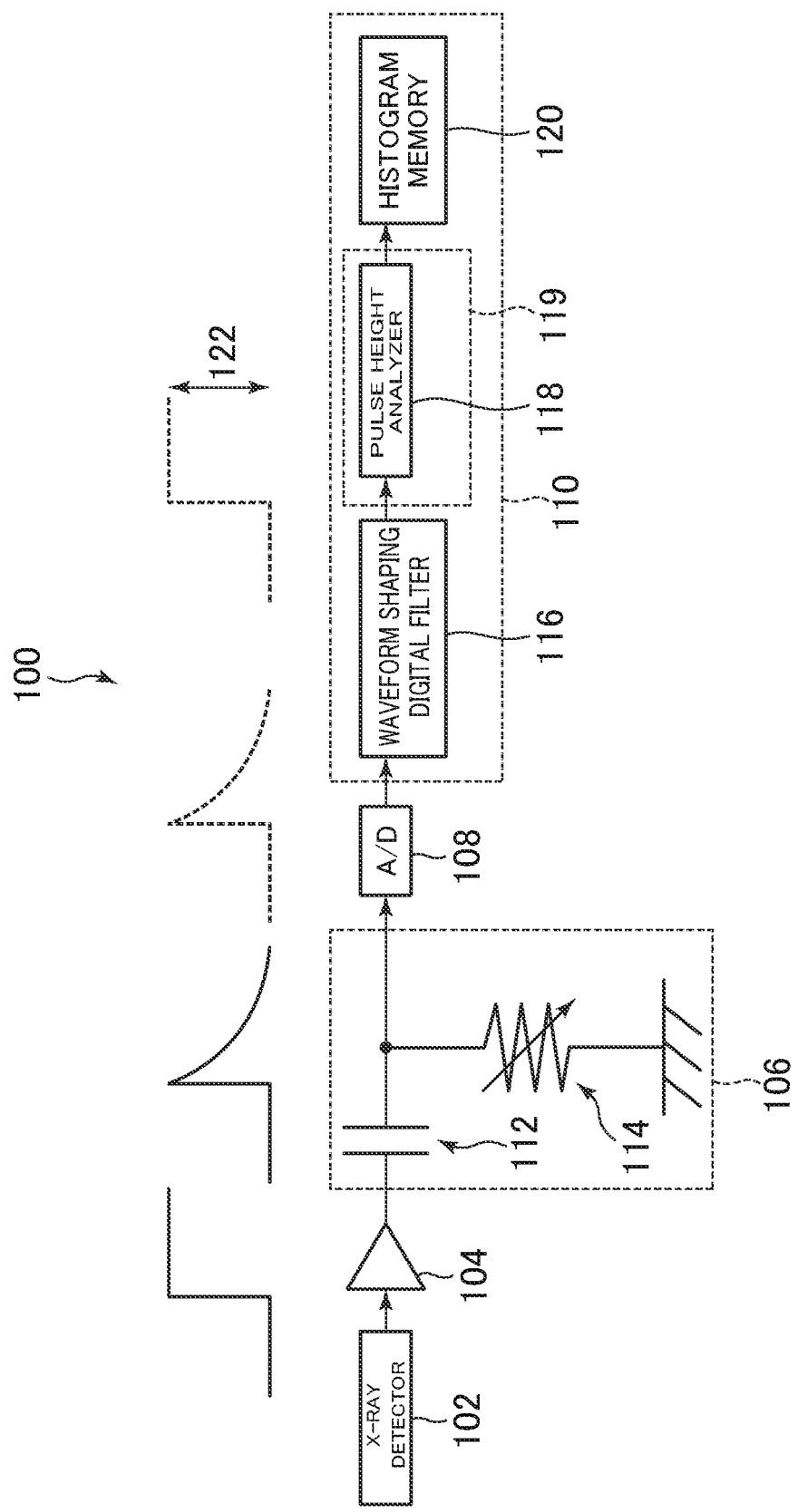
FIG. 1 is a diagram for schematically illustrating a signal processing device for X-ray analysis.

Now, a preferred embodiment (hereinafter referred to as "embodiment") for carrying out the present invention will be described. FIG. 1 is a diagram for schematically illustrating a signal processing device 100 for X-ray analysis according to the embodiment of the present invention. The signal processing device 100 for X-ray analysis includes an X-ray detector 102, a preamplifier 104, a differentiating circuit 106, an AD converter 108, and a digital signal processing unit 110.

The X-ray detector 102 converts, for example, characteristic X-rays emitted from a sample into an electric signal. Since the X-ray detector 102 is the same as that of a related art, a detailed description is omitted.

The preamplifier 104 is an amplifier configured to amplify the signal output from the X-ray detector 102. Specifically, the preamplifier 104 amplifies the electric signal output from the X-ray detector 102. The output signal from the preamplifier 104 is a stepped wave, and is an analog signal. Each step of the stepped wave indicates that X-ray has been detected, and the height of the step is proportional to the magnitude of the energy of the detected X-ray.

The differentiating circuit 106 uses a time constant (hereinafter referred to as "first time constant") to convert the signal output from the X-ray detector 102 into a differential wave that is analog signal. Specifically, for example, the differentiating circuit 106 converts the signal that is the stepped wave amplified through the preamplifier 104 into a waveform having such a shape as shown in FIG. 2(a). By converting a stepped wave into a differential wave as mentioned above, it is possible to ensure a wide dynamic range for the AD converter 108.

The differentiating circuit 106 includes, for example, a capacitor 112 and a variable resistor 114. The first time constant of the differentiating circuit 106 is expressed as the product of a capacitance of the capacitor 112 and a resistance value of the variable resistor 114. An attenuation rate of the differentiated signal is determined based on the first time constant. Two kinds of waveforms are shown in FIG. 2(a). One is a post-adjustment differential wave 202 generated by using the adjusted first time constant.. The other is a pre-adjustment differential wave 204 generated by using the non-adjusted first time constant. The first time constant is adjusted by changing the resistance value of the variable resistor 114.

A variable capacitor may be used as the capacitor 112 to adjust the first time constant by changing the magnitude of the capacitance of the variable capacitor. The differentiating circuit 106 illustrated in FIG. 1 is merely an example, and may be implemented by another configuration using, for example, an operational amplifier.

The AD converter 108 converts the differential wave that is the analog signal into a differential wave that is a digital signal. Specifically, the AD converter 108 converts the differential wave that is the analog signal output from the differentiating circuit 106 into a digital signal that can be processed by the digital signal processing unit 110 in the subsequent stage.

Some processes such as removing the attenuation caused by the time constant of the differentiating circuit 106 and pulse height analysis based on a measured pulse height are performed for the differential wave by the digital signal processing unit 110. The digital signal processing unit 110 includes a waveform shaping digital filter 116, a histogram generation unit 119 including a pulse height analyzer 118, and a histogram memory 120.

The waveform shaping digital filter 116 uses a second time constant to shape the differential wave that is the digital signal. In a first embodiment of the present invention, the waveform shaping digital filter 116 shapes the differential wave into a stepped wave. A method of shaping the waveform may be a method of shaping the waveform into a trapezoidal wave, a triangular wave, and a Gaussian wave, or other such function wave.

As the initial stage of waveform shaping, the waveform shaping digital filter 116 uses the second time constant to shape a differential wave such as shown in FIG. 2(a) into a stepped wave such as shown in FIG. 2(b). In this case, when the first time constant is a value adjusted in accordance with the second time constant, a shaped post-adjustment stepped wave 206 is flat after the rising edge. Meanwhile, when the first time constant has not been adjusted, a shaped pre-adjustment stepped wave 208 has a slope after the rising edge. For example, when the first time constant is small, the attenuation rate of the pre-adjustment differential wave 204 becomes faster as shown in FIG. 2(a). The pre-adjustment stepped wave 208 shaped from the pre-adjustment differential wave 204 has a negative slope after the rising edge.

The histogram generation unit 119 acquires a feature value of the shaped waveform based on pulse heights in at least two regions of the shaped waveform to generate a histogram representing an acquisition frequency for each feature value. Specifically, the histogram generation unit 119 generates a histogram representing the acquisition frequency for each feature value indicating a slope in a flat portion of the waveform based on the waveform shaped by the waveform shaping digital filter 116.

The pulse height analyzer 118 measures pulse heights in at least a first region 212 and a second region 216 in the flat portion of the shaped waveform, and acquires a difference between the measured values of the first region 212 and the second region 216 as the feature value. Specifically, the pulse height analyzer 118 measures a difference between the pulse heights in the first region 212 and the second region 216 in a flat portion after the rising edge included in the stepped wave, and acquires the difference as the feature value. For example, as shown in FIG. 2(b), the pulse height analyzer 118 calculates an average value of the pulse heights during a fixed period (first region 212) starting from a time point at which a first time period 210 has elapsed from the rising edge.

In addition, the pulse height analyzer 118 calculates an average value of the pulse heights during a fixed period (second region 216) starting from a time point at which a second time period 214 has elapsed from the rising edge. The pulse height analyzer 118 also measures a difference between the average value of the pulse heights in the first region 212 and the average value of the pulse heights in the second region 216. The pulse height analyzer 118 is, for example, a multi-channel analyzer configured to perform pulse height analysis by converting the pulse height into an energy value for each 10 eV. The first region 212 and the second region 216 may be set to have a predetermined time interval therebetween, or may be set so as to be adjacent to each other.

The first time period 210 is, for example, 6.6 µs. Further, the second time period 214 is set shorter than the first time period 210 so as to avoid an overlap between the first region 212 and the second region 216. The first time period 210 and the second time period 214 may be set so that the first region 212 and the second region 216 are adjacent to each other. Then, the pulse height analyzer 118 subtracts the average value of the pulse heights in the second region 216 from the average value of the pulse heights in the first region 212, and outputs the difference as the feature value.

The pulse height analyzer 118 acquires the feature value each time a waveform having a rising edge higher than a threshold value set in advance is input to the digital signal processing unit 110. The histogram generation unit 119 generates a histogram (see, for example, FIG. 3 and FIG. 5) representing the acquisition frequency for each feature value based on a plurality of feature values acquired by the pulse height analyzer 118.

In the first embodiment, the pulse heights in the first region 212 and the second region 216 are measured, but the pulse height analyzer 118 may measure the pulse heights in a large number of regions in a period after the rising edge, and calculate a difference between the respective regions.

In another case, the pulse height analyzer 118 may measure a difference between the pulse heights in at least two regions that have a predetermined time interval therebetween and are positioned across a rising edge included in a shaped waveform, and output the difference as the X-ray energy 122. Specifically, the first region 212 is set to a fixed period starting from a time point at which a predetermined period has elapsed from the rising edge. Meanwhile, the second region 216 is set to a fixed period starting from a time point preceding the rising edge by a predetermined time period. Then, the pulse height analyzer 118 subtracts the average value of the pulse heights in the second region 216 from the average value of the pulse heights in the first region 212, and outputs the difference as the X-ray energy 122.

With this processing, it is possible to measure the energy of the X-rays emitted from the sample by simply changing times at which the first region 212 and the second region 216 are set. Therefore, the signal processing device 100 for X-ray analysis according to one embodiment of the present invention can adjust the first time constant or the second time constant and analyze the sample without being provided with a new additional component.

The histogram memory 120 stores a histogram representing the acquisition frequency for each feature value. Specifically, the histogram memory 120 stores the above-mentioned difference measured over a predetermined period.

The first time constant or the second time constant is adjusted so that the energy at the peak of the histogram has a zero value. For example, when the energy at the peak of the histogram deviates from the zero value, the first time constant or the second time constant is adjusted under software control so that the energy at the peak has a zero value. Specifically, the signal processing device 100 for X-ray analysis includes a control unit (not shown) configured to control the magnitude of the resistance value of the variable resistor 114, which is described later, in accordance with the energy at the peak of the histogram value. The first time constant or the second time constant is adjusted by the control unit so that the energy at the peak has a zero value.

In another case, the first time constant or the second time constant may be manually adjusted by a user. Specifically, for example, the signal processing device 100 for X-ray analysis may further include an output unit configured to output, when the energy at the peak of the histogram deviates from the zero value, information indicating the deviation and an input unit configured to allow the user to adjust the first time constant or the second time constant based on the information indicating the deviation. The output unit is, for example, a display unit configured to display a histogram. The input unit is, for example, a knob for adjusting the resistance of the variable resistor 114. The user may change the magnitude of the resistance of the variable resistor while viewing the histogram displayed on the display unit.

Figure 3:
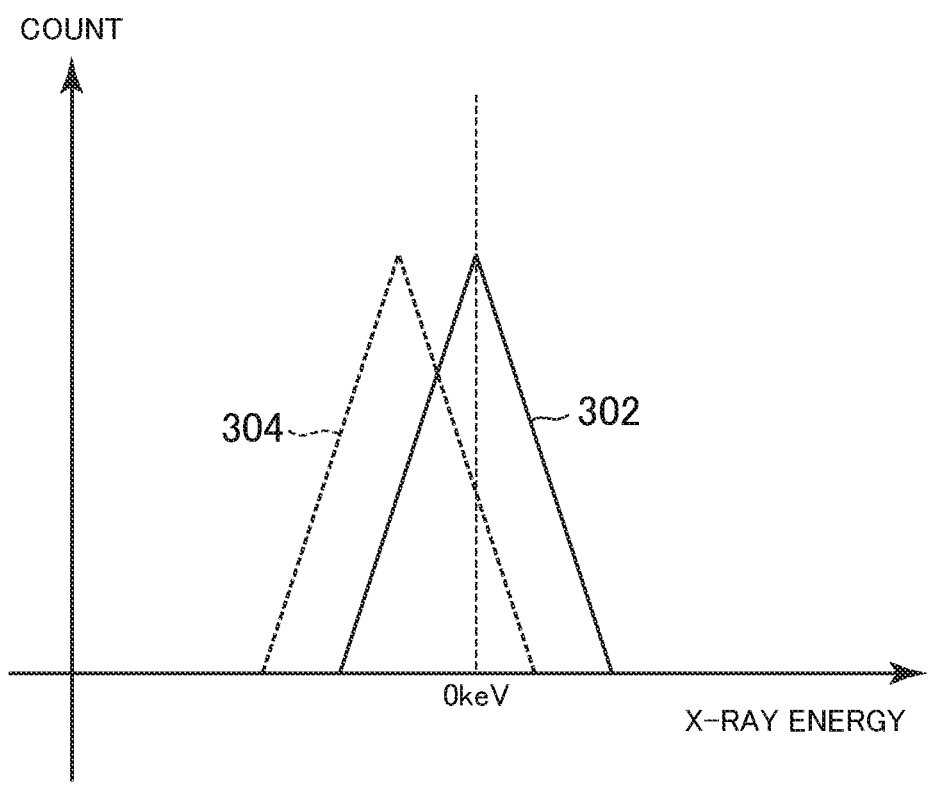
FIG. 3 is a graph for showing a histogram in the first embodiment.

FIG. 3 is a graph for showing a histogram stored in the histogram memory 120. When the first time constant is adjusted in accordance with the value of the second time constant, the shaped post-adjustment stepped wave 206 is flat after the rising edge. The difference between the pulse heights in the first region 212 and the second region 216 set in the flat region contains jitter in the measured energy due to electric noise, but ideally the center of the distribution of the histogram is a zero value. Therefore, in this case, a post-adjustment histogram 302 has a peak at a position at which the energy is zero.

Meanwhile, when the first time constant is not adjusted in accordance with the value of the second time constant, the shaped pre-adjustment stepped wave 208 has a slope after the rising edge. When the first region 212 and the second region 216 are set in the region after the rising edge and the feature value is calculated, the feature value has a fixed value. Therefore, a pre-adjustment histogram 304 has a peak at a position shifted from the position at which the energy is zero.

Therefore, by adjusting the first time constant or the second time constant so that the position of the peak of the above-mentioned histogram becomes the position at which the energy is zero, it is possible to perform the adjustment with high precision.

Figure 4:
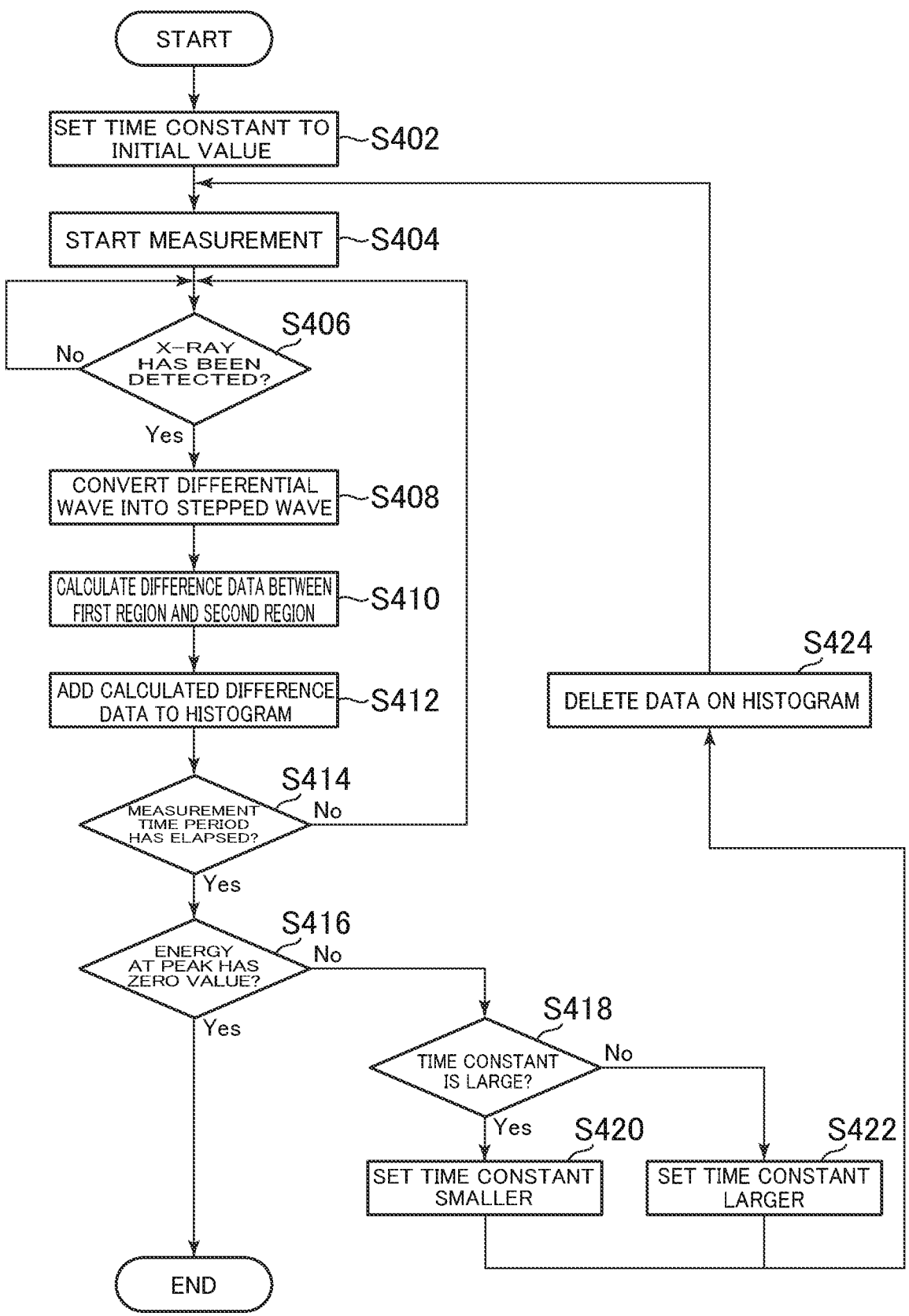
FIG. 4 is a flow chart for illustrating a process of adjusting a time constant in the first embodiment.

Next, a description is given of an adjustment method for the signal processing device 100 for X-ray analysis. FIG. 4 is a flow chart for illustrating a process of adjusting the first time constant.

First, the first time constant is set to an initial value (Step S402). Specifically, the resistance value of the variable resistor 114 of the differentiating circuit 106 is set to an initial value. Although the second time constant is fixed in the first embodiment, the second time constant may be changed in place of the first time constant in the following processing steps.

Subsequently, an X-ray spectrometer starts the measurement (Step S404). Specifically, for example, Fe55 or other such sealed radiation source is used as an X-ray source (not shown), and radiation is directly applied to the X-ray detector 102. An X-ray tube is used in place of the sealed radiation source to irradiate a sample for calibration with X-rays and X-rays emitted from the sample may be detected by the X-ray detector 102. The X-ray spectrometer also performs the measurement during a set measurement time period. When X-rays enter, the X-ray detector 102 outputs a signal that is a stepped wave. The signal output from the X-ray detector 102 is converted into a differential wave that is an analog signal by using the first time constant. In addition, the differential wave that is the analog signal is converted into the differential wave that is the digital signal.

When the waveform having the rising edge higher than the threshold value set in advance is input, that is, when X-ray is detected (Step S406), the waveform shaping digital filter 116 uses the second time constant to shape the differential wave that is the digital signal (Step S408). When X-ray is not detected, the measurement is continued until the measurement time period reaches a time period set in advance.

The pulse height analyzer 118 measures the pulse heights in at least two regions of the shaped waveform, and acquires the feature values from the pulse heights (Step S410). Specifically, for example, the pulse height analyzer 118 acquires the difference between the average value of the pulse heights in the first region 212 and the average value of the pulse heights in the second region 216 as the feature value.

The histogram memory 120 stores the calculated difference as the feature value in addition to the histogram (Step S412). Unless the measurement time period has currently reached the time period set in advance, the procedure advances to Step S406 again.

When the measurement time period has reached the time period set in advance (Step S414), the validity of the time constant is determined based on whether or not the position of the peak is near the position at which the energy is zero (Step S416). With the processing steps from Step S404 to Step S414, the histogram generation unit 119 acquires the feature value of the shaped waveform based on the pulse heights in at least two regions of the shaped waveform, and generates the histogram representing the acquisition frequency for each feature value. The measurement time period is, for example, 10 seconds. The determination may be performed by the user, or may be performed under software control. For example, the control unit (not shown) included in the signal processing device 100 for X-ray analysis determines that the time constant is valid when the energy at the peak of the histogram is (0 keV)±(2 eV). When it is determined that the time constant is valid, adjustment work is brought to an end.

Meanwhile, when it is determined that the time constant is invalid, the control unit adjusts the first time constant or the second time constant so as to suppress a change in the pulse height in the flat portion after the rising edge included in the waveform (Step S418). In the first embodiment, the first time constant is adjusted in accordance with the energy at the peak of the histogram.

For example, when the peak of the histogram is located at a position higher than the position at which the energy is zero, the first time constant is a value larger than an appropriate value. Therefore, in order to decrease the first time constant, the resistance value of the variable resistor of the differentiating circuit 106 is set smaller (Step S420). Meanwhile, when the peak of the histogram is located at a position lower than the position at which the energy is zero, the first time constant is a value smaller than an appropriate value. Therefore, in order to increase the first time constant, the resistance value of the variable resistor of the differentiating circuit 106 is set larger (Step S422).

As described above, the processing steps of changing the resistance value of the variable resistor may be performed by the user, or may be performed by the signal processing device 100 for X-ray analysis under software control. When the user performs the above-mentioned work, the adjustment work is performed by the user changing the resistance value of the variable resistor 114 while viewing the histogram displayed on a display serving as the output unit of the X-ray spectrometer.

Meanwhile, when the control is performed by the signal processing device 100 for X-ray analysis under software control, the signal processing device 100 for X-ray analysis may perform feedback control based on the energy at the peak of the histogram. Specifically, when the peak of the histogram is located at a position lower than the position at which the energy is zero, the signal processing device 100 for X-ray analysis may increase the resistance value of the variable resistor 114 by a predetermined magnitude. Meanwhile, when the peak of the histogram is located at a position higher than the position at which the energy is zero, the signal processing device 100 for X-ray analysis may reduce the resistance value of the variable resistor 114 by a predetermined magnitude. When the time constant is adjusted under software control, for example, a digital potentiometer is used as the variable resistor 114.

Figure 5:
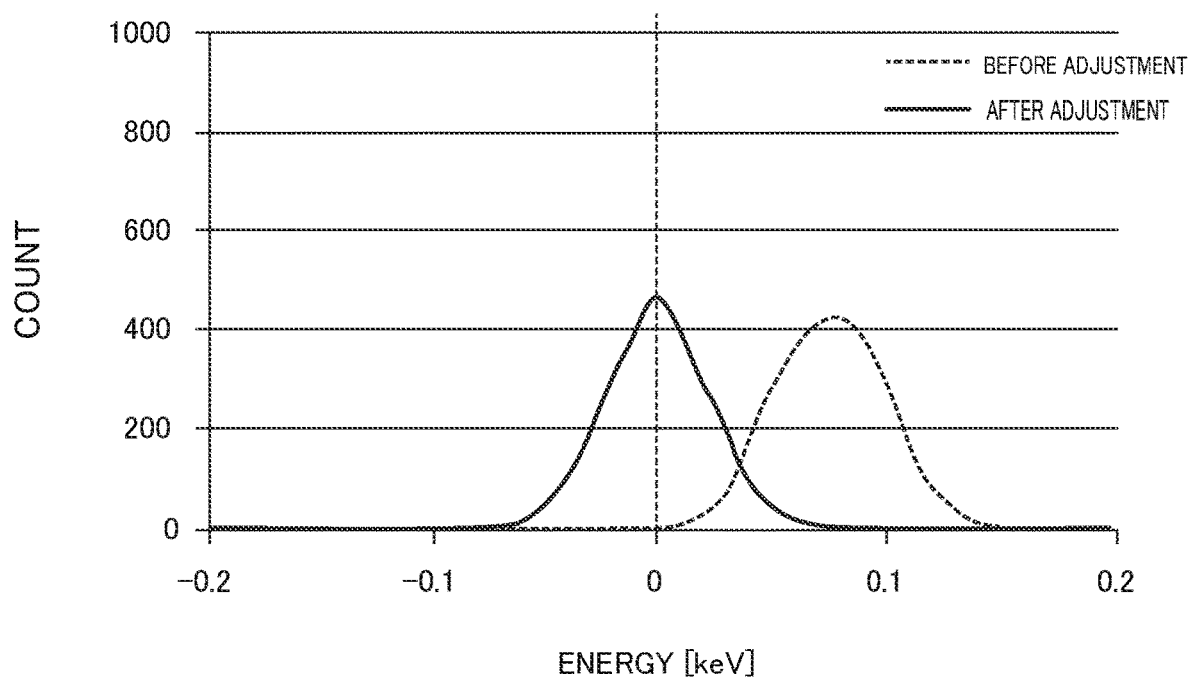
FIG. 5 is a graph for showing a histogram of actual measurement in the first embodiment.

When the time constant is changed, data on the histogram stored in the histogram memory 120 is deleted (Step S424). After that, the procedure advances to Step S404 again to perform the measurement again. The above-mentioned adjustment work is repeatedly performed, and finally, the energy at the peak of the histogram is adjusted so as to become near a zero value. In FIG. 5, an actual histogram is shown.

With the above-mentioned processing steps, it is possible to flatten the shaped stepped wave. When the measurement time period is set to 10 seconds as described above, the number of measurements required for the adjustment is three to four, and hence the adjustment takes 30 seconds to 40 seconds. In another case, the adjustment may be performed while sequentially deleting the data on the histogram for a period preceding by a fixed time period without setting the measurement time period. By adjusting the time constant in this manner, it is possible to improve the accuracy of the energy of the X-rays to be measured.

The above description has been given of the case in which the first time constant or the second time constant is adjusted by reducing the slope in the flat region of the stepped wave, but the embodiment of the present invention is not limited thereto. For example, radiation having known energy or a standard sample including an element known in advance may be used to adjust the first time constant or the second time constant so that the peak value of the histogram indicates known energy. Now, a description will be given of a modification example of the first embodiment.

In this modification example, the waveform shaping digital filter 116 shapes the differential wave into a stepped wave in the same manner as described above. The pulse height analyzer 118 measures a peak value or a step height included in the shaped waveform, and acquires the peak value or the step height as the above-mentioned feature value. Specifically, the pulse height analyzer 118 measures the difference between the pulse heights in the first region 212 and the second region 216 that are positioned across the rising edge included in the stepped wave as the step height, and acquires the step height as the above-mentioned feature value. The first time constant or the second time constant is adjusted so that the energy at the peak has a predetermined value when the energy at the peak of the histogram deviates from the predetermined value.

Specifically, first, the X-ray source starts to irradiate the X-ray detector 102 with X-rays having known energy. In FIG. 6(a), there are shown the pre-adjustment differential wave 204, which has been detected based on the applied X-rays, and the post-adjustment differential wave 202.

As shown in FIG. 6(b), the first region 212 indicates a fixed period starting from the time point at which the first time period 210 has elapsed from the rising edge. The second region 216 indicates a fixed period starting from a time point preceding the rising edge by the second time period 214. The first time period 210 and the second time period 214 may be set so that the first region 212 and the second region 216 are adjacent to each other. The pulse height analyzer 118 subtracts the average value of the pulse heights in the second region 216 from the average value of the pulse heights in the first region 212, and outputs the difference as the feature value.

Figure 7:
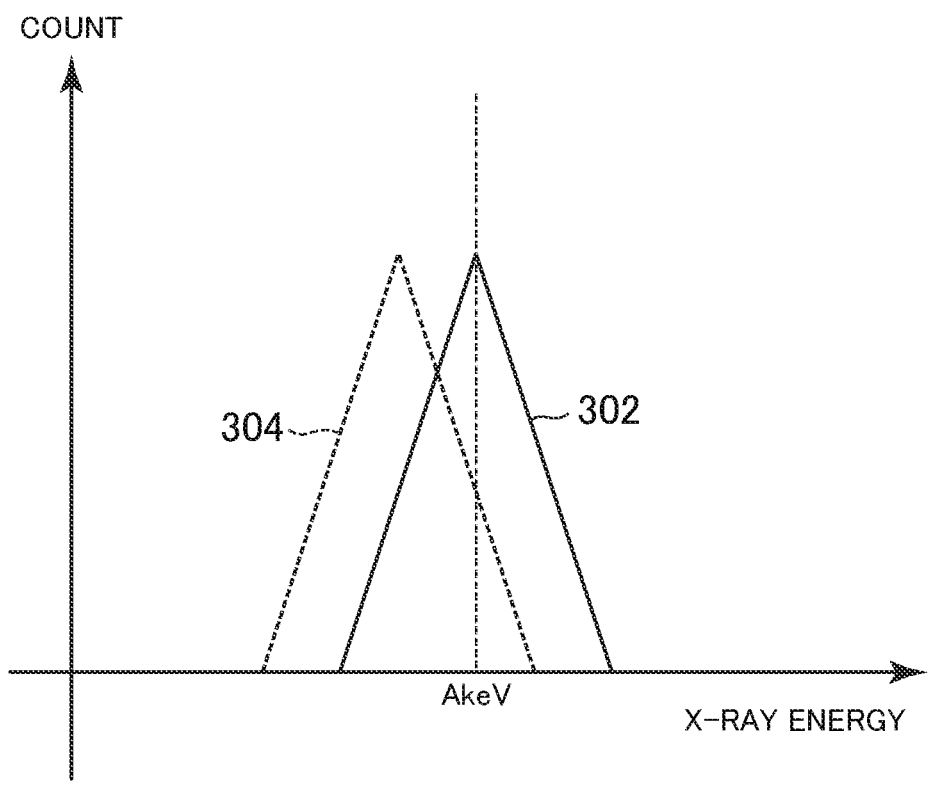
FIG. 7 is a graph for showing a histogram in the modification example of the first embodiment.

FIG. 7 is a graph for showing a histogram generated in this modification example using the same method as described above. When the first time constant is adjusted in accordance with the value of the second time constant, the shaped post-adjustment stepped wave 206 is flat after the rising edge. The region before the rising edge, which attenuates from the rising edge (not shown) due to the previous X-ray detection with the same time constant, is also flat due to the fact that the first time constant is processed in the same manner.

Therefore, ideally the difference between the pulse heights in the first region 212 set after the rising edge and the second region 216 set before the rising edge becomes a known energy value (A keV). Therefore, in this case, as the post-adjustment histogram 302, a histogram having a peak at the energy of A keV is generated. In this modification example, a plurality of peaks are sometimes observed depending on the X-ray source, but for the sake of simplicity of description, one of those peaks is shown in FIG. 7.

Meanwhile, when the first time constant is not adjusted in accordance with the value of the second time constant, the shaped pre-adjustment stepped wave 208 has a slope after the rising edge. The pre-adjustment stepped wave 208 also has a slope before the rising edge (not shown), and a time period from the previous rising edge to the subsequent rising edge is not fixed. Therefore, the difference between the pulse heights in the first region 212 and the second region 216 is different from the known energy value (A keV) intrinsic to, for example, the element in the standard sample. Therefore, in this case, as the pre-adjustment histogram 304, a histogram having a peak at a position shifted from the energy of A keV is generated.

According to this modification example, the component used for adjusting the first time constant or the second time constant and the component required for measuring the X-ray energy can be shared. This enables a simple configuration of the signal processing device 100 for X-ray analysis.

Also in this modification example, the pulse heights in the first region 212 and the second region 216 are measured, but the pulse height analyzer 118 may measure pulse heights in a larger number of regions, and calculate differences between the respective regions. In addition, the first time constant or the second time constant may be adjusted under software control so that the energy at the peak has a predetermined value when the energy at the peak of the histogram deviates from the predetermined value. The signal processing device 100 for X-ray analysis may further include the output unit and the input unit, which are the same as those units described above, to allow the user to manually adjust the first time constant or the second time constant.

In this modification example, the first time constant or the second time constant may also be adjusted so that the peak of the histogram has the minimum full width at half maximum. Specifically, a plurality of first time constants are used in advance to create a plurality of histograms described above. Then, the first time constant corresponding to the histogram having the smallest full width at half maximum, among the plurality of histograms, may be set as the first time constant after the adjustment. According to the above-mentioned method, it is possible to adjust the time constant through use of X-rays having energy that is unknown.

Second Embodiment

Next, a second embodiment of the present invention will be described. In the second embodiment and third and fourth embodiments of the present invention, descriptions of the same components as those of the first embodiment are omitted.

In the second embodiment, the waveform shaping digital filter 116 shapes the differential wave into a stepped wave, and then shapes the stepped wave into a trapezoidal wave based on a difference between the pulse heights in two regions 800 having a predetermined time interval therebetween.

Specifically, in the same manner as in the first embodiment, the waveform shaping digital filter 116 uses the second time constant to shape the differential wave that is the digital signal. With this processing, as shown in FIG. 8(a), the differential wave is shaped into the stepped wave.

Subsequently, the waveform shaping digital filter 116 calculates each of the average values of the pulse heights in the two regions 800 having a predetermined time interval therebetween, which are shown in FIG. 8(a). In this case, the two regions 800 are moved while maintaining the predetermined time interval therebetween from before the rising edge to after the rising edge. That is, the waveform shaping digital filter 116 calculates each of moving averages in the two regions 800. In addition, the waveform shaping digital filter 116 calculates a difference between the average values of the pulse heights in the two regions 800 at each time point. With this processing, as shown in FIG. 8(b), the stepped wave is shaped into a trapezoidal wave.

The pulse height analyzer 118 measures a difference between the pulse heights in the first region 212 and the second region 216 in a flat portion of any one of a top portion and a bottom portion of the trapezoidal wave, and acquires the difference as the above-mentioned feature value. Specifically, for example, as shown in FIG. 8(b), the first region 212 is set before the rising edge of the trapezoidal wave. Meanwhile, the second region 216 is set after the falling edge of the trapezoidal wave. In this case, the pulse height analyzer 118 calculates the average value of pulse heights during the fixed period (first region 212) starting from a time point preceding the rising edge by the first time period 210. In addition, the pulse height analyzer 118 calculates the average value of the pulse heights during the fixed period (second region 216) starting from the time point at which the second time period 214 has elapsed from the rising edge. The pulse height analyzer 118 further measures the difference between the average value of the pulse heights in the first region 212 and the average value of the pulse heights in the second region 216, and acquires the difference as the feature value.

For example, as shown in FIG. 8(c), the first region 212 and the second region 216 may be both set in a flat portion after the rising edge of the trapezoidal wave and before a falling edge thereof. In this case, the pulse height analyzer 118 calculates the average value of pulse heights during the fixed period (first region 212) starting from a time point at which the first time period 210 has elapsed from the rising edge. In addition, the pulse height analyzer 118 calculates the average value of the pulse heights during the fixed period (second region 216) starting from the time point at which the second time period 214 has elapsed from the rising edge.

In another case, for example, as shown in FIG. 8(d), the first region 212 and the second region 216 may be both set in a flat portion after the falling edge of the trapezoidal wave. In this case, the pulse height analyzer 118 calculates the average value of the pulse heights during the fixed period (first region 212) starting from the time point at which the first time period 210 has elapsed from the rising edge. The pulse height analyzer 118 also calculates the average value of the pulse heights during the fixed period (second region 216) starting from the time point at which the second time period 214 has elapsed from the rising edge.

In another case, for example, as shown in FIG. 9(a), the first region 212 and the second region 216 may both be set in a flat portion before the rising edge of the trapezoidal wave. In this case, the pulse height analyzer 118 calculates the average value of the pulse heights during the fixed period (first region 212) starting from the time point preceding the rising edge by the first time period 210. The pulse height analyzer 118 also calculates the average value of the pulse heights during the fixed period (second region 216) starting from the time point preceding the rising edge by the second time period 214.

Figure 8:
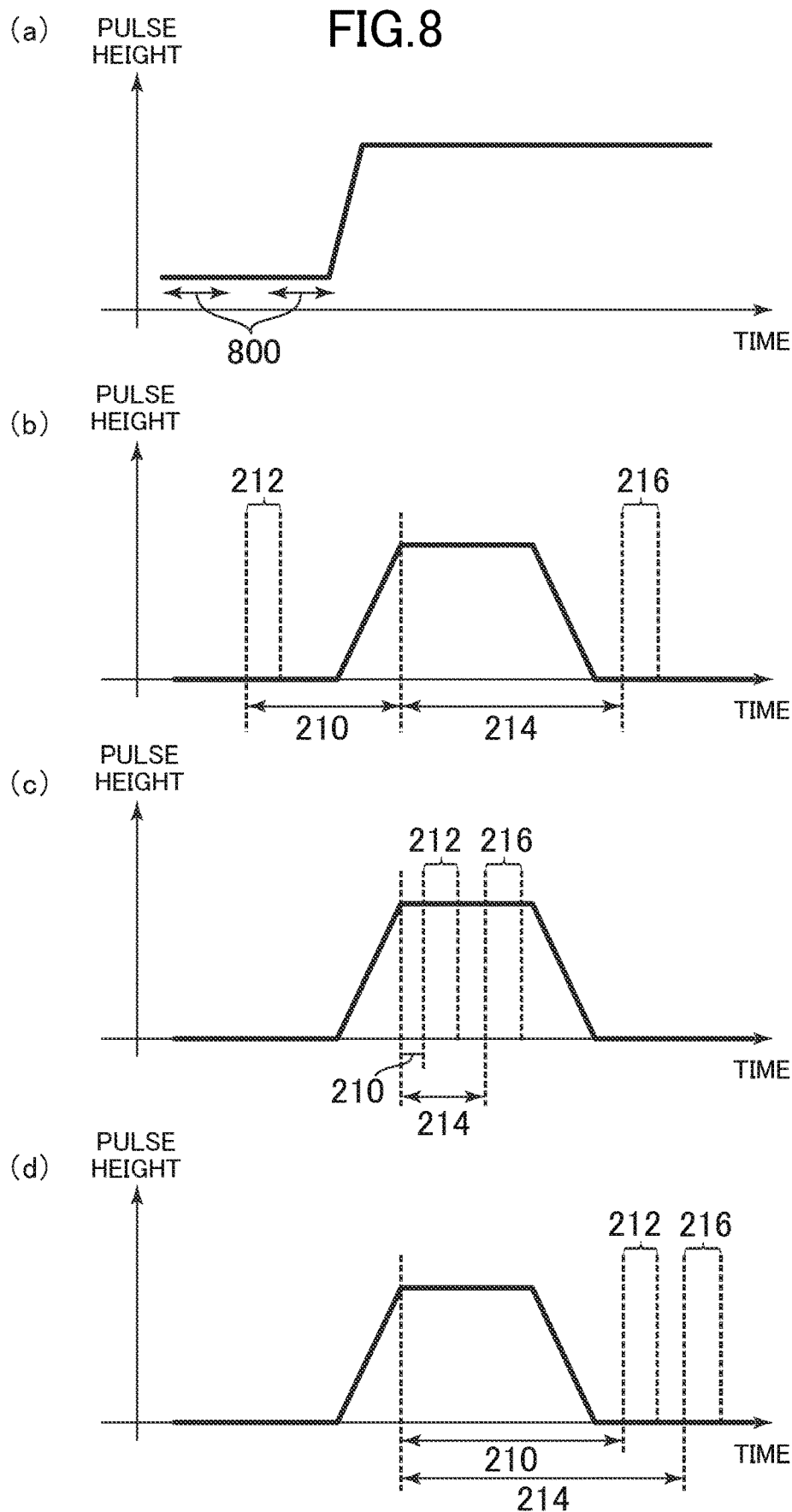
FIG. 8 are graphs for each showing a waveform in a second embodiment of the present invention.

When a portion after the rising edge of the stepped wave shown in FIG. 8(a) is flat, the top portion of the trapezoidal wave or a portion after the falling edge thereof are also flat. Therefore, the energy at the peak of the histogram ideally has a zero value. However, for example, when the first time constant is smaller than the second time constant, the stepped wave has a shape having a slope after the rising edge. In this case, as shown in FIG. 9(b), the trapezoidal wave has a shape having a slope in the top portion or after the falling edge. In FIG. 8(b) to FIG. 9(a), the positions of the first region 212 and the second region 216 may be exchanged.

Therefore, in the same manner as in the first embodiment, by adjusting the first time constant or the second time constant so that the position of the peak of the above-mentioned histogram becomes the position at which the energy is zero, it is possible to perform the adjustment with high precision.

Also in the second embodiment, in the same manner as in the modification example of the first embodiment, a radiation of known energy or a standard sample including an element known in advance may be used to adjust the first time constant or the second time constant so that the peak value of the histogram indicates known energy.

In the same manner as described above, the waveform shaping digital filter 116 shapes the differential wave into a stepped wave, and then shapes the stepped wave into the trapezoidal wave based on the difference between the pulse heights in the two regions 800 having a predetermined time interval therebetween.

The pulse height analyzer 118 measures a difference between the pulse heights in the first region 212 in the top portion of the trapezoidal wave and the second region 216 in the flat portion before the rising edge or after the falling edge as the step height, and acquires the step height as the feature value.

Specifically, as shown in FIG. 9(c), the first region 212 is a region set in the top portion of the trapezoidal wave, which indicates a fixed period starting from a time point at which the first time period 210 has elapsed from the rising edge. The second region 216 is a region set before the rising edge of the trapezoidal wave, which indicates a fixed period starting from a time point preceding the rising edge by the second time period 214. The pulse height analyzer 118 subtracts the average value of the pulse heights in the second region 216 from the average value of the pulse heights in the first region 212, and acquires the difference as the feature value.

In another case, as shown in FIG. 9(d), the second region 216 may be a region set after the falling edge of the trapezoidal wave, which indicates a fixed period starting from the time point at which the second time period 214 has elapsed from the rising edge. Also in this case, the pulse height analyzer 118 subtracts the average value of the pulse heights in the second region 216 from the average value of the pulse heights in the first region 212, and acquires the difference as the feature value.

Also in this modification example, in the same manner as in the modification example of the first embodiment, the above-mentioned step height ideally becomes a known energy value (A keV) of X-rays. Therefore, the first time constant or the second time constant may be adjusted so that the post-adjustment histogram 302 has the peak at the energy of A keV.

Third Embodiment

Next, the third embodiment will be described. In the third embodiment, the waveform shaping digital filter 116 shapes the differential wave into a stepped wave, and then shapes the stepped wave into a triangular wave based on a difference between the pulse heights in two regions 800 adjacent to each other.

Specifically, in the same manner as in the first embodiment, the waveform shaping digital filter 116 uses the second time constant to shape the differential wave that is the digital signal. With this processing, as shown in FIG. 10(a), the differential wave is shaped into the stepped wave.

Subsequently, the waveform shaping digital filter 116 calculates each of the average values of the pulse heights in the two regions 800 that are adjacent to each other, and which are shown in FIG. 10(a). The third embodiment is different from the second embodiment in that the two regions 800 are adjacent to each other. The two regions 800 are moved from before the rising edge to after the rising edge. That is, the waveform shaping digital filter 116 calculates each of moving averages in the two regions 800. In addition, the waveform shaping digital filter 116 calculates the difference between the average values of the pulse heights in the two regions 800 at each time point. With this processing, as shown in FIG. 10(b), the stepped wave is shaped into a triangular wave.

The pulse height analyzer 118 measures the pulse heights in the first region 212 and the second region 216 in the flat portion of the bottom portion of the triangular wave, and acquires the difference as the feature value. Specifically, for example, as shown in FIG. 10(b), the first region 212 is set in a flat portion before a peak position of the triangular wave. Meanwhile, the second region 216 is set in a flat portion after the peak position of the triangular wave. In this case, the pulse height analyzer 118 calculates the average value of the pulse heights during the fixed period (first region 212) starting from a time point preceding the peak position by the first time period 210. In addition, the pulse height analyzer 118 calculates the average value of the pulse heights during the fixed period (second region 216) starting from the time point at which the second time period 214 has elapsed from the peak position. The pulse height analyzer 118 further measures the difference between the average value of the pulse heights in the first region 212 and the average value of the pulse heights in the second region 216, and acquires the difference as the feature value.

For example, as shown in FIG. 10(c), the first region 212 and the second region 216 may both be set in a flat portion after the peak position of the triangular wave. In this case, the pulse height analyzer 118 calculates the average value of the pulse heights during the fixed period (first region 212) starting from the time point at which the first time period 210 has elapsed from the peak position. The pulse height analyzer 118 further calculates the average value of the pulse heights during the fixed period (second region 216) starting from the time point at which the second time period 214 has elapsed from the peak position.

Further, for example, as shown in FIG. 10(d), the first region 212 and the second region 216 may both be set in a flat portion before the peak position of the triangular wave. In this case, the pulse height analyzer 118 calculates the average value of the pulse heights during the fixed period (first region 212) starting from the time point preceding the peak position by the first time period 210. The pulse height analyzer 118 further calculates the average value of the pulse heights during the fixed period (second region 216) starting from the time point preceding the peak position by the second time period 214. In FIG. 10(b) to FIG. 10(d), the positions of the first region 212 and the second region 216 may be exchanged.

Figure 11:
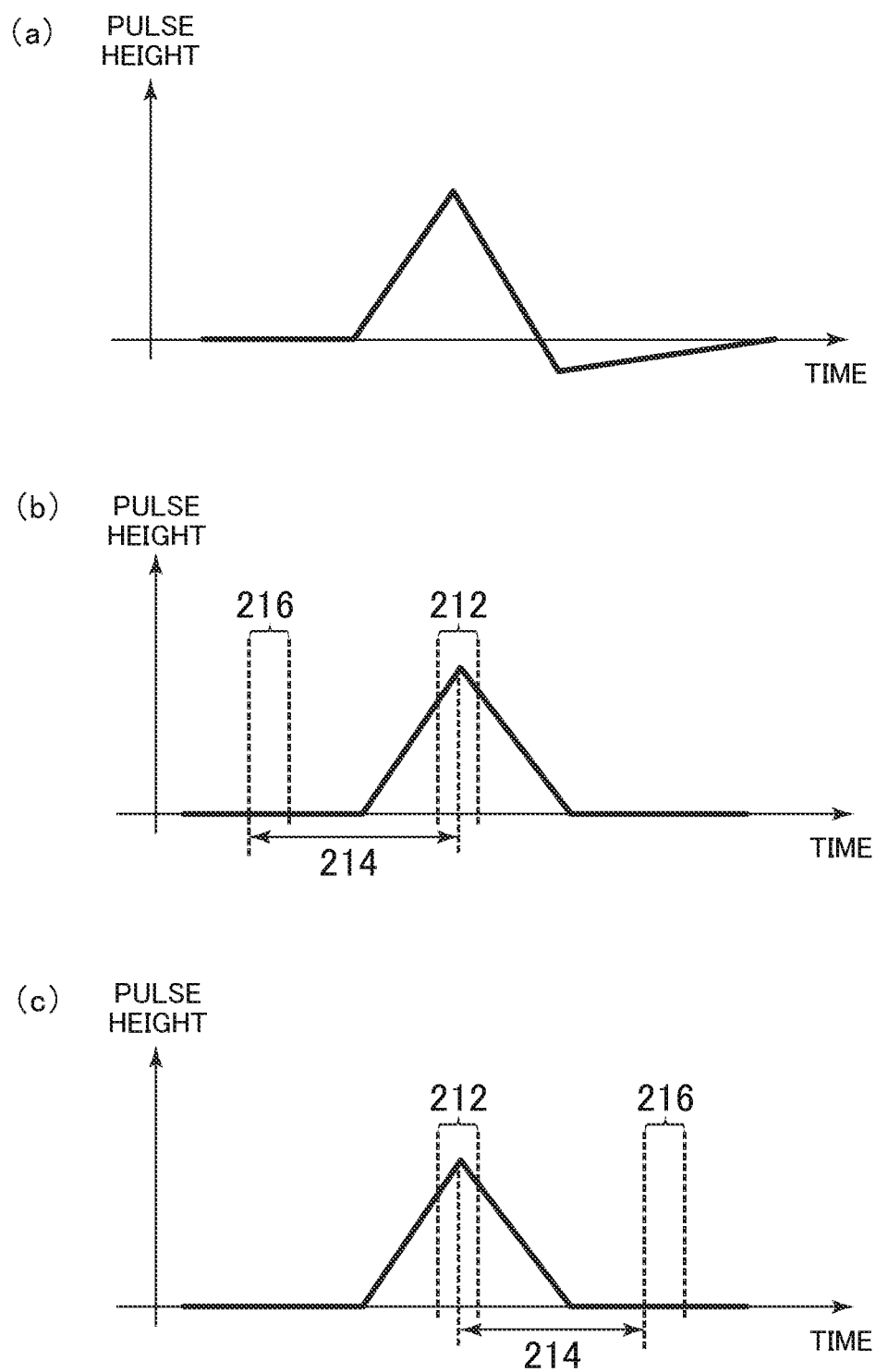
FIG. 11 are graphs for each showing a waveform in the third embodiment.
Figure 14:
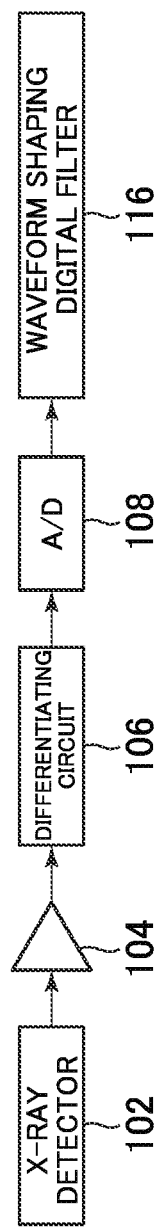
FIG. 14 is a diagram for illustrating a configuration of a conventional signal processing device for X-ray analysis.

When a portion after the rising edge of the stepped wave shown in FIG. 10(a) is flat, a region after the falling edge of the triangular wave is also flat. Therefore, the energy at the peak of the histogram ideally has a zero value. However, for example, when the first time constant is smaller than the second time constant, the shaped waveform has a shape having a slope after the rising edge. In this case, as shown in FIG. 11(a), the triangular wave has a shape having a slope in the region after the falling edge.

Therefore, in the same manner as in the first embodiment, by adjusting the first time constant or the second time constant so that the position of the peak of the above-mentioned histogram becomes the position at which the energy is zero, it is possible to perform the adjustment with high precision.

Also in the third embodiment, in the same manner as in the modification example of the first embodiment, a radiation of known energy or a standard sample including an element known in advance may be used to adjust the first time constant or the second time constant so that the peak value of the histogram indicates known energy.

In the same manner as described above, the waveform shaping digital filter 116 shapes the differential wave into a stepped wave, and then shapes the stepped wave into the triangular wave based on the difference between the pulse heights in the two regions 800 adjacent to each other.

The pulse height analyzer 118 measures a difference between the pulse heights in the first region 212 including the peak of the triangular wave and the second region 216 in a flat portion before the peak position or after the peak position as the peak value, and acquires the peak value as the feature value. Specifically, as shown in FIG. 11(b), the first region 212 indicates a fixed period having the peak position of the triangular wave as its center. The second region 216 is a region set in the flat portion, which indicates a fixed period starting from a time point preceding the peak position of the triangular wave by the second time period 214. The pulse height analyzer 118 subtracts the average value of the pulse heights in the second region 216 from the average value of the pulse heights in the first region 212, and measures the difference as the peak value. The pulse height analyzer 118 acquires the peak value as the feature value.

In another case, as shown in FIG. 11(c), the second region 216 may be a region set in the flat portion, which indicates a fixed period starting from the time point at which the second time period 214 has elapsed from the peak position. Also in this case, the pulse height analyzer 118 subtracts the average value of the pulse heights in the second region 216 from the average value of the pulse heights in the first region 212, and acquires the difference as the feature value.

Also in this modification example, in the same manner as in the modification example of the first embodiment, the above-mentioned peak value ideally becomes a known energy value (A keV) of X-rays. Therefore, the first time constant or the second time constant may be adjusted so that the post-adjustment histogram 302 has the peak at the energy of A keV.

Fourth Embodiment

Next, the fourth embodiment will be described. In the fourth embodiment, the waveform shaping digital filter 116 shapes the differential wave into a stepped wave, and then uses a third time constant to differentiate the stepped wave and further integrate the stepped wave at least once, to thereby shape the stepped wave into a Gaussian wave.

Specifically, in the same manner as in the first embodiment, the waveform shaping digital filter 116 uses the second time constant to shape the differential wave that is the digital signal. With this processing, in the same manner as in the third embodiment, the differential wave is shaped into the stepped wave.

Subsequently, the waveform shaping digital filter 116 uses the third time constant to differentiate the stepped wave. With this processing, as shown in FIG. 12(a), the stepped wave is again shaped into a differential wave. In addition, the waveform shaping digital filter 116 uses the third time constant to perform integration on the differentiated waveform four times. With this processing, as shown in FIG. 12(b), the differential wave is shaped into a Gaussian wave. The shaping method is a shaping method called "CR-(RC)n", where n represents a natural number. The number of times n to perform the integration may be other than 4, but it is known that the shaped waveform becomes a Gaussian waveform when n is set to 4.

The pulse height analyzer 118 measures the difference between the pulse heights in the first region 212 and the second region 216 in the flat portion of a bottom portion of the Gaussian wave, and acquires the difference as the feature value. Specifically, for example, as shown in FIG. 12(b), the first region 212 is set in a flat portion before a peak position of the Gaussian wave. Meanwhile, the second region 216 is set in a flat portion after the peak position of the Gaussian wave. In this case, the pulse height analyzer 118 calculates the average value of the pulse heights during the fixed period (first region 212) from a time point preceding the peak position by the first time period 210. In addition, the pulse height analyzer 118 calculates the average value of the pulse heights during the fixed period (second region 216) starting from the time point at which the second time period 214 has elapsed from the peak position. The pulse height analyzer 118 further measures a difference between the average value of the pulse heights in the first region 212 and the average value of the pulse heights in the second region 216, and acquires the difference as the feature value.

For example, as shown in FIG. 12(c), the first region 212 and the second region 216 may both be set in a flat portion after the peak position of the Gaussian wave. In this case, the pulse height analyzer 118 calculates the average value of the pulse heights during the fixed period (first region 212) starting from the time point at which the first time period 210 has elapsed from the peak position. The pulse height analyzer 118 further calculates the average value of the pulse heights during the fixed period (second region 216) starting from the time point at which the second time period 214 has elapsed from the peak position.

In another case, for example, as shown in FIG. 12(d), the first region 212 and the second region 216 may both be set in a flat portion before the peak position of the Gaussian wave. In this case, the pulse height analyzer 118 calculates the pulse heights during the fixed period (first region 212) starting from the time point preceding the rising edge by the first time period 210. The pulse height analyzer 118 also calculates the average value of the pulse heights during the fixed period (second region 216) from a time point preceding the peak position by the second time period 214. In FIG. 12(b) to FIG. 12(d), the positions of the first region 212 and the second region 216 may be exchanged.

When a portion after the rising edge of the stepped wave is flat, a region after the falling edge of the Gaussian wave is also flat. Therefore, the energy at the peak of the histogram ideally has a zero value. However, for example, when the first time constant is smaller than the second time constant, the shaped waveform has a shape having a slope after the rising edge. In this case, as shown in FIG. 13(a), the Gaussian wave has a shape having a slope in the region after the falling edge.

Therefore, in the same manner as in the first embodiment, by adjusting the first time constant or the second time constant so that the position of the peak of the above-mentioned histogram becomes the position at which the energy is zero, it is possible to perform the adjustment with high precision.

Also in the fourth embodiment, in the same manner as in the modification example of the first embodiment, a radiation of known energy or a standard sample including an element known in advance may be used to adjust the first time constant or the second time constant so that the peak value of the histogram indicates known energy.

In the same manner as described above, the waveform shaping digital filter 116 shapes the differential wave into a stepped wave, and then uses a third time constant to differentiate the stepped wave and further integrate the stepped wave at least once, to thereby shape the stepped wave into a Gaussian wave.

The pulse height analyzer 118 measures a difference between the pulse heights in the first region 212 including the peak of the Gaussian wave and the second region 216 in a flat portion before the peak position or after the peak position as the peak value, and acquires the peak value as the feature value. Specifically, as shown in FIG. 13(b), the first region 212 indicates a fixed period having the peak position of the Gaussian wave as its center. The second region 216 is a region set in the flat portion, which indicates a fixed period starting from a time point preceding the peak position of the Gaussian wave by the second time period 214. The pulse height analyzer 118 subtracts the average value of the pulse heights in the second region 216 from the average value of the pulse heights in the first region 212, and measures the difference as the peak value. The pulse height analyzer 118 acquires the peak value as the feature value.

In another case, as shown in FIG. 13(c), the second region 216 may be a region set in the flat portion, which indicates a fixed period starting from the time point at which the second time period 214 has elapsed from the peak position. Also in this case, the pulse height analyzer 118 subtracts the average value of the pulse heights in the second region 216 from the average value of the pulse heights in the first region 212, and acquires the difference as the feature value.

Also in this modification example, in the same manner as in the modification example of the first embodiment, the above-mentioned peak value ideally becomes a known energy value (A keV) of X-rays. Therefore, the first time constant or the second time constant may be adjusted so that the post-adjustment histogram 302 has the peak at the energy of A keV.

The present invention is not limited to the above-mentioned embodiments, and various modifications can be made thereto. The above-mentioned configuration of the signal processing device 100 for X-ray analysis is merely an example, and the present invention is not limited thereto. The configuration described in each of the above-mentioned embodiments may be replaced by substantially the same configuration, a configuration that produces the same action and effect, or a configuration that achieves the same goal.

For example, also in the second to fourth embodiments, in the same manner as in the first embodiment, the pulse height analyzer 118 may measure pulse heights in a larger number of regions than the two regions including the first region 212 and the second region 216, and measure the differences between the respective regions. In addition, the first time constant or the second time constant may be adjusted under software control, or may be manually adjusted by the user. In another case, the first time constant or the second time constant may be adjusted so as to minimize the full width at half maximum of the peak of the histogram.

REFERENCE SIGNS LIST 100 signal processing device for X-ray analysis, 102 X-ray detector, 104 preamplifier, 106 differentiating circuit, 108 AD converter, 110 digital signal processing unit, 112 capacitor, 114 variable resistor, 116 waveform shaping digital filter, 118 pulse height analyzer, 119 histogram generation unit, 120 histogram memory, 122 X-ray energy, 202 post-adjustment differential wave, 204 pre-adjustment differential wave, 206 post-adjustment stepped wave, 208 pre-adjustment stepped wave, 210 first time period, 212 first region, 214 second time period, 216 second region, 302 post-adjustment histogram, 304 pre-adjustment histogram, 800 two regions.

The invention claimed is:

1. A signal processing device for X-ray analysis, comprising:
   a differentiating circuit configured to use a first time constant to convert a signal output from an X-ray detector into a differential wave that is an analog signal;
   an AD converter configured to convert the differential wave that is the analog signal into a differential wave that is a digital signal;
   a waveform shaping digital filter configured to use a second time constant to shape the differential wave that is the digital signal; and
   a digital signal processor configured to measure pulse heights in at least a first region and a second region of the shaped waveform, calculate a difference between the measured values in the first region and the second region as a feature value of the shaped waveform and generate a histogram representing an acquisition frequency for each feature value.

2. The signal processing device for X-ray analysis according to claim 1,
   wherein the digital signal processor includes a pulse height analyzer configured to measure pulse heights,
   wherein at least one of a first region and a second region is located in a flat portion of the shaped waveform, and
   wherein the first time constant or the second time constant is adjusted under software control so that energy at a peak of the histogram has a zero value when the energy at the peak deviates from the zero value.

3. The signal processing device for X-ray analysis according to claim 1,
   wherein the digital signal processor includes a pulse height analyzer configured to measure pulse heights,
   wherein at least one of a first region and a second region is located in a flat portion of the shaped waveform, and acquire a difference between the measured values in the first region and the second region as the feature value, and
   wherein the signal processing device for X-ray analysis further comprises:
      a display configured to output, when energy at a peak of the histogram deviates from a zero value, information indicating the deviation; and
      a knob configured to allow a user to adjust the first time constant or the second time constant based on the information indicating the deviation.

4. The signal processing device for X-ray analysis according to claim 3,
   wherein the waveform shaping digital filter is configured to shape the differential wave into a stepped wave, and
   wherein the pulse height analyzer is configured to measure a difference between the pulse heights in the first region and the second region in a flat portion after a rising edge included in the stepped wave, and acquire the difference as the feature value.

5. The signal processing device for X-ray analysis according to claim 3,
   wherein the waveform shaping digital filter is configured to shape the differential wave into a stepped wave, and then shape the stepped wave into a trapezoidal wave based on a difference between pulse heights in two regions having a predetermined time interval therebetween, and wherein the pulse height analyzer is configured to measure a difference between the pulse heights in the first region and the second region in a flat portion of any one of a top portion and a bottom portion of the trapezoidal wave, and acquire the difference as the feature value.

6. The signal processing device for X-ray analysis according to claim 3, wherein the waveform shaping digital filter is configured to shape the differential wave into a stepped wave, and then shape the stepped wave into a triangular wave based on a difference between pulse heights in two regions adjacent to each other, and wherein the pulse height analyzer is configured to measure a difference between the pulse heights in the first region and the second region in a flat portion of a bottom portion of the triangular wave, and acquire the difference as the feature value.

7. The signal processing device for X-ray analysis according to claim 3, wherein the waveform shaping digital filter is configured to shape the differential wave into a stepped wave, and then use a third time constant to differentiate the stepped wave and further integrate the stepped wave at least once, to thereby shape the stepped wave into a Gaussian wave, and wherein the pulse height analyzer is configured to measure a difference between the pulse heights in the first region and the second region in a flat portion of a bottom portion of the Gaussian wave, and acquire the difference as the feature value.

8. The signal processing device for X-ray analysis according to claim 3, wherein the differentiating circuit includes a capacitor and a variable resistor, and wherein the first time constant is adjusted by the variable resistor.

9. The signal processing device for X-ray analysis according claim 3, wherein the pulse height analyzer is further configured to measure a difference between pulse heights in at least two regions that are positioned across a rising edge included in the shaped waveform, and acquire the difference as X-ray energy.

10. The signal processing device for X-ray analysis according to claim 1, wherein the digital signal processor includes a pulse height analyzer configured to measure a peak value or a step height included in the shaped waveform as the difference between the measured values in the first region and the second region, and wherein the first time constant or the second time constant is adjusted under software control so that energy at a peak of the histogram has a predetermined value when the energy at the peak deviates from the predetermined value.

11. The signal processing device for X-ray analysis according to claim 1, wherein the digital signal processor includes a pulse height analyzer configured to measure a peak value or a step height included in the shaped waveform as the difference between the measured values in the first region and the second region, and wherein the signal processing device for X-ray analysis further comprises:

a display configured to output, when energy at a peak of the histogram deviates from a predetermined value, information indicating the deviation; and a knob configured to allow a user to adjust the first time constant or the second time constant based on the information indicating the deviation.

12. The signal processing device for X-ray analysis according to claim 11, wherein the waveform shaping digital filter is configured to shape the differential wave into a stepped wave, and wherein the pulse height analyzer is configured to measure a difference between the pulse heights in a first region and a second region that are positioned across a rising edge included in the stepped wave as the step height, and acquire the step height as the feature value.

13. The signal processing device for X-ray analysis according to claim 11, wherein the waveform shaping digital filter is configured to shape the differential wave into a stepped wave, and then shape the stepped wave into a trapezoidal wave based on a difference between pulse heights in two regions having a predetermined time interval therebetween, and wherein the pulse height analyzer is configured to measure a difference between the pulse heights in a first region in a top portion of the trapezoidal wave and a second region in a flat portion before a rising edge of the trapezoidal wave or after a falling edge of the trapezoidal wave as the step height, and acquire the step height as the feature value.

14. The signal processing device for X-ray analysis according to claim 11, wherein the waveform shaping digital filter is configured to shape the differential wave into a stepped wave, and then shape the stepped wave into a triangular wave based on a difference between pulse heights in two regions adjacent to each other, and wherein the pulse height analyzer is configured to measure a difference between the pulse heights in a first region including a peak of the triangular wave and a second region in a flat portion before the peak position of the triangular wave or after the peak position as the peak value, and acquire the peak value as the feature value.

15. The signal processing device for X-ray analysis according to claim 11, wherein the waveform shaping digital filter is configured to shape the differential wave into a stepped wave, and then use a third time constant to differentiate the stepped wave and further integrate the stepped wave at least once, to thereby shape the stepped wave into a Gaussian wave, and wherein the pulse height analyzer is configured to measure a difference between the pulse heights in a first region including a peak of the Gaussian wave and a second region in a flat portion before the peak position of the Gaussian wave or after the peak position as the peak value, and acquire the peak value as the feature value.

16. The signal processing device for X-ray analysis according to claim 1, wherein the digital signal processor includes a pulse height analyzer configured to measure pulse heights in at least the first region and the second region in a flat portion of the shaped waveform, wherein the pulse height analyzer calculate an average value of the pulse heights during a fixed period starting from a time point at which the predetermined period has elapsed from a rising edge or a time point preceding the rising edge by a predetermined time period as measured pulse heights in a first region or a second region.

17. An adjustment method for a signal processing device for X-ray analysis, the adjustment method comprising the steps of:

using a first time constant to convert a signal output from an X-ray detector into a differential wave that is an analog signal;

converting the differential wave that is the analog signal into a differential wave that is a digital signal;

using a second time constant to shape the differential wave that is the digital signal; and measuring pulse heights in at least a first region and a second region of the shaped waveform, calculating a difference between the measured values in the first region and the second region as a feature value of a shaped waveform and generating a histogram representing an acquisition frequency for each feature value, the steps being performed by a digital signal processor.

\* \* \* \* \*